US011858291B2

(12) United States Patent
Skillicorn

(10) Patent No.: US 11,858,291 B2
(45) Date of Patent: Jan. 2, 2024

(54) CARPENTER SQUARE

(71) Applicant: WOODPECKERS, LLC, Strongsville, OH (US)

(72) Inventor: Gregory L. Skillicorn, Granger Township, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 57 days.

(21) Appl. No.: 17/572,768

(22) Filed: Jan. 11, 2022

(65) Prior Publication Data
US 2023/0219362 A1 Jul. 13, 2023

(51) Int. Cl.
B43L 7/027 (2006.01)
G01B 3/04 (2006.01)

(52) U.S. Cl.
CPC .............. B43L 7/0275 (2013.01); G01B 3/04 (2013.01)

(58) Field of Classification Search
None
See application file for complete search history.

(56) References Cited

U.S. PATENT DOCUMENTS

| 5,170,568 | A | * | 12/1992 | Wright | B43L 7/0275 33/476 |
| 5,727,325 | A | * | 3/1998 | Mussell | B43L 7/027 33/476 |
| 6,820,345 | B2 | * | 11/2004 | Evans | B25H 7/00 33/500 |
| 6,868,616 | B2 | * | 3/2005 | Allemand | E04D 15/025 33/476 |
| 6,886,268 | B1 | * | 5/2005 | Morse | E04F 21/1855 52/DIG. 1 |
| 7,398,601 | B2 | * | 7/2008 | Morrell | B25H 7/00 33/429 |
| 7,543,388 | B2 | * | 6/2009 | Christensen | E04F 21/003 33/562 |
| 7,743,521 | B2 | * | 6/2010 | O'Morrow, Sr. | B43L 7/027 33/417 |
| 8,074,368 | B2 | * | 12/2011 | Atwood | B25H 7/00 33/465 |
| 9,180,725 | B2 | * | 11/2015 | Lin | B43L 7/033 |

(Continued)

FOREIGN PATENT DOCUMENTS

| DE | 3534223 | A | * | 8/1986 | ............... B25H 7/00 |
| EP | 2420795 | A1 | * | 2/2012 | ............. G01B 3/566 |

Primary Examiner — Christopher W Fulton
(74) Attorney, Agent, or Firm — SAND, SEBOLT & WERNOW CO., LPA

(57) ABSTRACT

A carpenter square including a triangular plate and a base. The base has a corner at an intersection of a first side and first end. The corner extends into a pivot notch defined in a first side edge of the plate. During use, the base's corner may be placed on a side wall of a workpiece and the plate is pivoted about a pivot axis extending along the base's corner. An angular measurement may be marked on the workpiece's surface when a selected angle on the plate aligns with an edge of the workpiece that extends along an intersection of the workpiece's surface and side wall. First and second regions of the plate extend outwardly beyond opposite ends of the base. Each of the first and second regions includes a distance measurement scale and the first region further includes one or more angular measurement scales.

21 Claims, 19 Drawing Sheets

(56) References Cited

U.S. PATENT DOCUMENTS

| | | | | |
|---|---|---|---|---|
| 2002/0053142 A1* | 5/2002 | Brunetti | .................. | B25H 7/00 |
| | | | | 33/194 |
| 2006/0156558 A1* | 7/2006 | Owens | ................. | B43L 13/028 |
| | | | | 33/42 |
| 2013/0227846 A1* | 9/2013 | Buzzell | ................ | B43L 7/0275 |
| | | | | 33/32.2 |

* cited by examiner

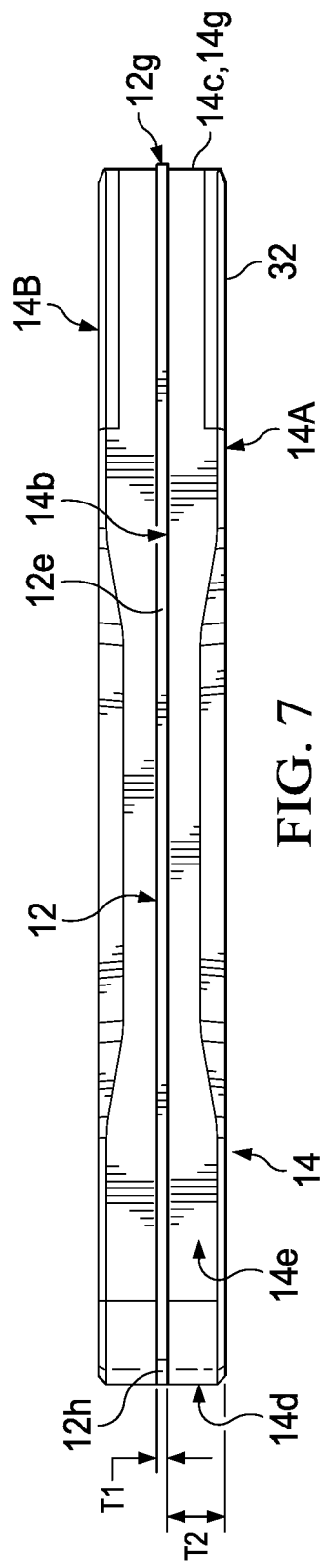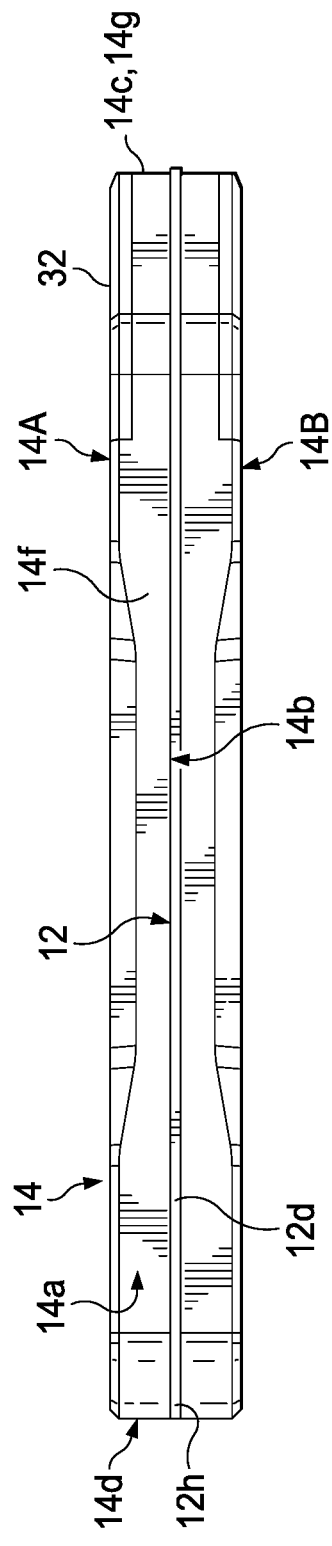
FIG. 7
FIG. 8

CARPENTER SQUARE

TECHNICAL FIELD

This disclosure is directed to woodworking tools and equipment. More particularly, the present disclosure relates to a carpenter square. Specifically, the present disclosure is directed to a carpenter square that includes a triangular plate and a base arranged, in one aspect, to form a first region and a second region which extend outwardly from the base in opposite directions. Each of the first and second regions includes a distance measurement scale. The base forms a corner at an intersection of a first side and a first end. The corner extends into a pivot notch defined in a first side edge of the plate.

BACKGROUND

Carpenter squares are used to measure and then mark distances and/or angles on a workpiece that is to be cut or worked in some manner. Typically, carpenter squares comprise a triangular plate that includes a distance measurement scale and one or more angular measurement scales. In some instances, a base or handle is engaged with the plate to aid the carpenter in manipulating the triangular plate.

The distance measurement scale is typically located along one side edge of the triangular plate and the angular measurement scale(s) are provided along the hypotenuse of the plate. The carpenter will place the plate on a surface of the workpiece and measure off the desired distance or angle and then mark that measured distance or angle on the workpiece's surface with a marking implement.

The triangular plates of presently known carpenter scales tend to be relatively thick. The thickness of the plate can cause parallax errors because it is difficult to make a mark on the workpiece's surface that properly lines up with a measurement marking on one of the distance or angular measurement scales on the plate. These measurement errors tend to increase in number if a base or handle is provided on the carpenter square as the increased thickness of the base moves the measurement scales even further from the workpiece's surface. In some instances, carpenters may try and angle the plate downwardly towards the workpiece's surface in an attempt to reduce the distance between the measurement scales and the surface to be marked. This arrangement can be particularly problematic if the measuring marking has to be made some distance inwardly from a side edge of the workpiece.

SUMMARY

The present disclosure relates to a carpenter square that addresses and overcomes many of the shortcomings of presently known carpenter squares. The carpenter square disclosed herein includes a triangular plate and a base or handle engaged therewith. The triangular plate is thinner than presently known carpenter squares, thus reducing the distance between the measurement scales and the workpiece's surface and thereby tending to reduce parallax errors for the carpenter. Furthermore, the base has a corner at an intersection of a first side and a first end thereof. The corner extends into a pivot notch defined in a first side edge of the triangular plate. An angular measurement may be marked on the workpiece's surface when a selected angle on the plate aligns with an edge of the workpiece that extends along an intersection of the workpiece's surface and side wall. During use, the corner of the base on the carpenter square is able to be placed on a side wall of a workpiece and the plate is pivoted about a pivot axis extending along the base's corner. This configuration of the base's corner and the plate's pivot notch provides for improved and more precise marking of angles on a workpiece surface than was possible in previously known carpenter squares.

In one embodiment, first and second regions of the plate extend outwardly beyond opposite ends of the base. Each of the first and second regions includes a distance measurement scale and the first region further includes one or more angular measurement scales. The carpenter square may be moved between a first orientation where the distance measurement scale on the first region is used to mark distances on the workpiece's surface. The carpenter square may also be moved to a second orientation where the distance measurement scale on the second region is used to mark distances on the workpiece's surface. This second orientation is particularly helpful if the marking is to be made a distance from a side edge of the workpiece.

In one aspect, an exemplary embodiment of the present disclosure may provide a carpenter square comprising a plate which is triangular in shape, wherein the plate includes a first side edge and a second side edge arranged at a right angle to one another, and a hypotenuse located opposite the right angle; and a base operatively engaged with plate and being arranged generally parallel to the second side edge of the plate; wherein the base has a first side and a first end that intersect at a corner; wherein the plate defines a pivot notch in the first side edge; and wherein the corner extends over the pivot notch when the base is engaged with the plate.

In another aspect, an exemplary embodiment of the present disclosure may provide a carpenter square comprising a plate which is triangular in shape, wherein the plate includes a first side edge and a second side edge arranged at a right angle to one another, and a hypotenuse located opposite the right angle; and a base operatively engaged with plate; wherein the base has a first end and a second end opposed to the first end, wherein one or both of the first end and the second end is parallel to the second side edge of the plate; and wherein a first region of the plate extends outwardly beyond the first end of the base in a first direction, and a second region of the plate extends outwardly beyond the second end of the base in a second direction.

In another aspect, and exemplary embodiment of the present disclosure may provide a method of marking a measurement on a workpiece comprising providing a carpenter square comprising a triangular plate having a first side edge, a second side edge arranged at a right angle to the first side edge, and a hypotenuse located opposite the right angle; a base engaged with the triangular plate, wherein the base has a first end and a second end opposed to the first end, wherein one or both of the first end and the second end is parallel to the second side edge of the plate; wherein a first region of the plate extends outwardly beyond the first end of the base in a first direction, and a second region of the plate extends outwardly beyond the second end of the base in a second direction; providing at least one first measurement scale on the first region of the plate; providing a second measurement scale on the second region of the plate; using the carpenter square with the plate in a first orientation to measure one of a distance and an angle with the at least one first measurement scale; and using the carpenter square with the plate in a second orientation to measure a distance with the second measurement scale.

In one embodiment, the method may further comprise placing the plate on a surface of the workpiece in the first orientation and making a marking on the surface of the workpiece adjacent a selected one of a distance marking and an angle marking on the at least one first measurement scale. In one embodiment, the method may further comprise placing the plate on a surface of the workpiece in the second orientation and making a marking on the surface of the workpiece adjacent a selected distance marking on the second measurement scale.

In one embodiment, using the carpenter square with the plate in the first orientation may include placing a surface of the first region of the plate in abutting contact with a first workpiece surface, and placing the first end of the base adjacent a second workpiece surface, wherein the second workpiece surface is at right angles to the first workpiece surface. In one embodiment, using the carpenter square with the plate in the second orientation may include placing a surface of the second region of plate in abutting contact with the first workpiece surface, and placing the second end of the base adjacent the second workpiece surface.

In another aspect, and exemplary embodiment of the present disclosure may provide a method of marking a measurement on a workpiece comprising providing a carpenter square including a plate which is triangular in shape, wherein the plate includes a first side edge and a second side edge arranged at a right angle to one another, and a hypotenuse located opposite the right angle; and a base operatively engaged with plate and being arranged generally parallel to the second side edge of the plate; wherein the base has a first side and a first end that intersect at a corner; wherein the plate defines a pivot notch in the first side edge; and wherein the corner extends over the pivot notch when the base is engaged with the plate; providing an angular measurement scale on the plate; placing the plate onto a surface of a workpiece; placing the corner of the base in abutting contact with a first side wall of the workpiece, wherein the first side wall intersects the surface of the workpiece along an edge; pivoting the plate about a pivot axis which extends along the corner of the base and through the pivot notch; aligning a selected measurement marking on the angular measurement scale with the edge of the workpiece; and marking a line on the surface of the workpiece and along the hypotenuse of the plate.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 7 is a top plan view thereof;

FIG. 8 is a bottom plan view thereof;

Similar numbers refer to similar parts throughout the drawings.

DETAILED DESCRIPTION

Referring to FIGS. 1-8 there is shown a first embodiment of a carpenter square in accordance with the present disclosure, generally indicated at 10. Carpenter square 10 (also referred to herein as "square 10"), is comprised of a triangular plate 12 and a base 14 which is secured to plate 12.

Figure 4:
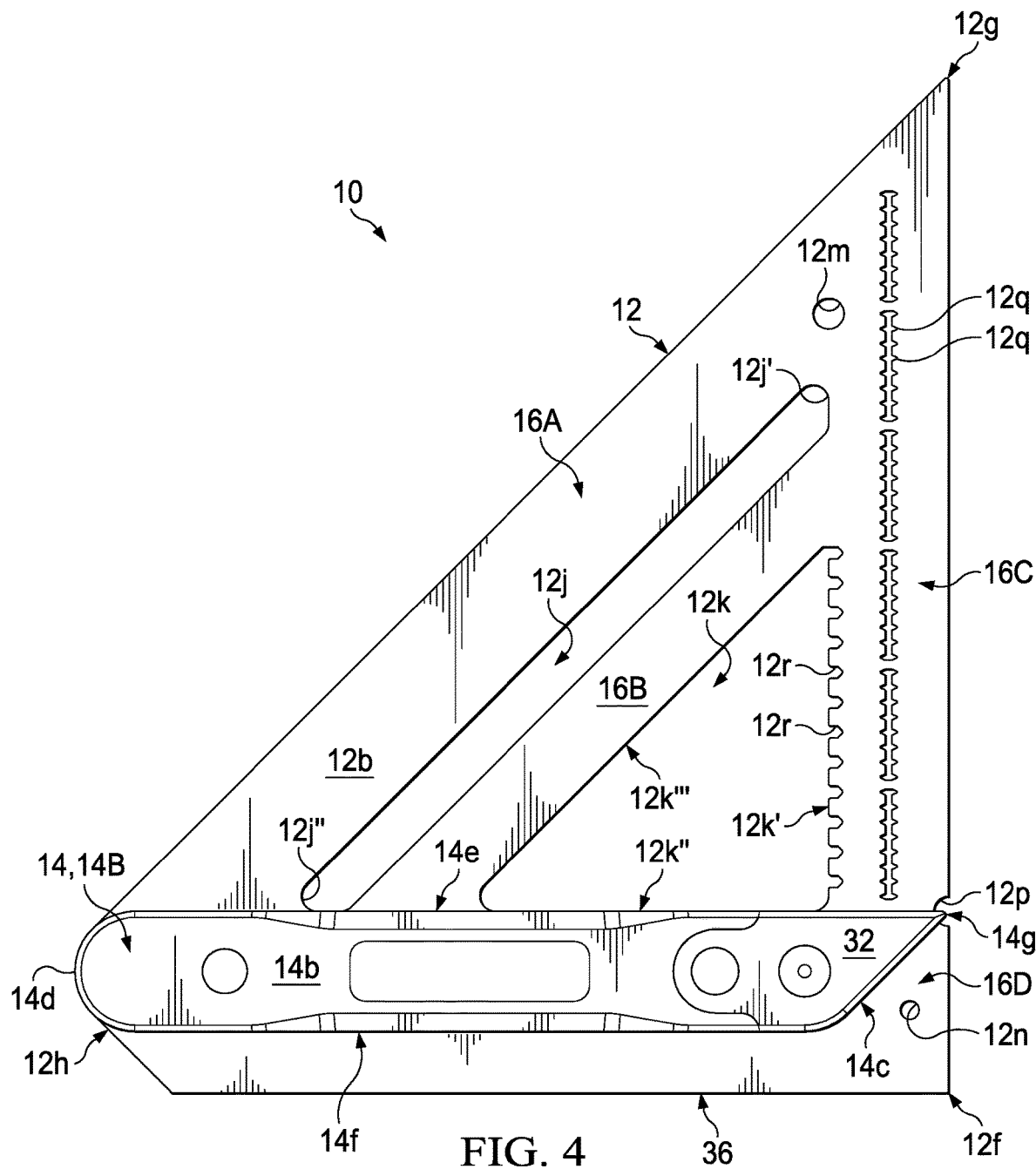
FIG. 4 is a rear elevation view thereof.

Plate 12 preferably is fabricated out of stainless steel and has a first surface 12a and a second surface 12b (FIG. 4). It should be noted that plate 12 is not illustrated in FIG. 4 as including any markings or indicia thereon for clarity of illustration. It will be understood, however, that second surface 12b of plate 12 is provided with angle measurement markings and distance measurement markings and associated indicia that are identical to those shown on first surface 12a and as discussed herein in various locations. It will be understood that providing markings and indicia on both of the first surface 12a and second surface 12b enables carpenter square 10 to be used by either a right-handed person or a left-handed person. It will be understood that in another embodiment, second surface 12b of plate 12 is free of any measurement markings and indicia thereon. In yet another embodiment, the measurement markings and indicia may be provided only on the second surface 12b of plate 12 and not on the first surface 12a thereof. If, in these other embodiments, the markings and indicia are provided on only one of the first surface 12a and the second surface 12b then, in those instances, the carpenter square 10 is dedicated for use by either a right-handed person or a left-handed person.

Figure 1:
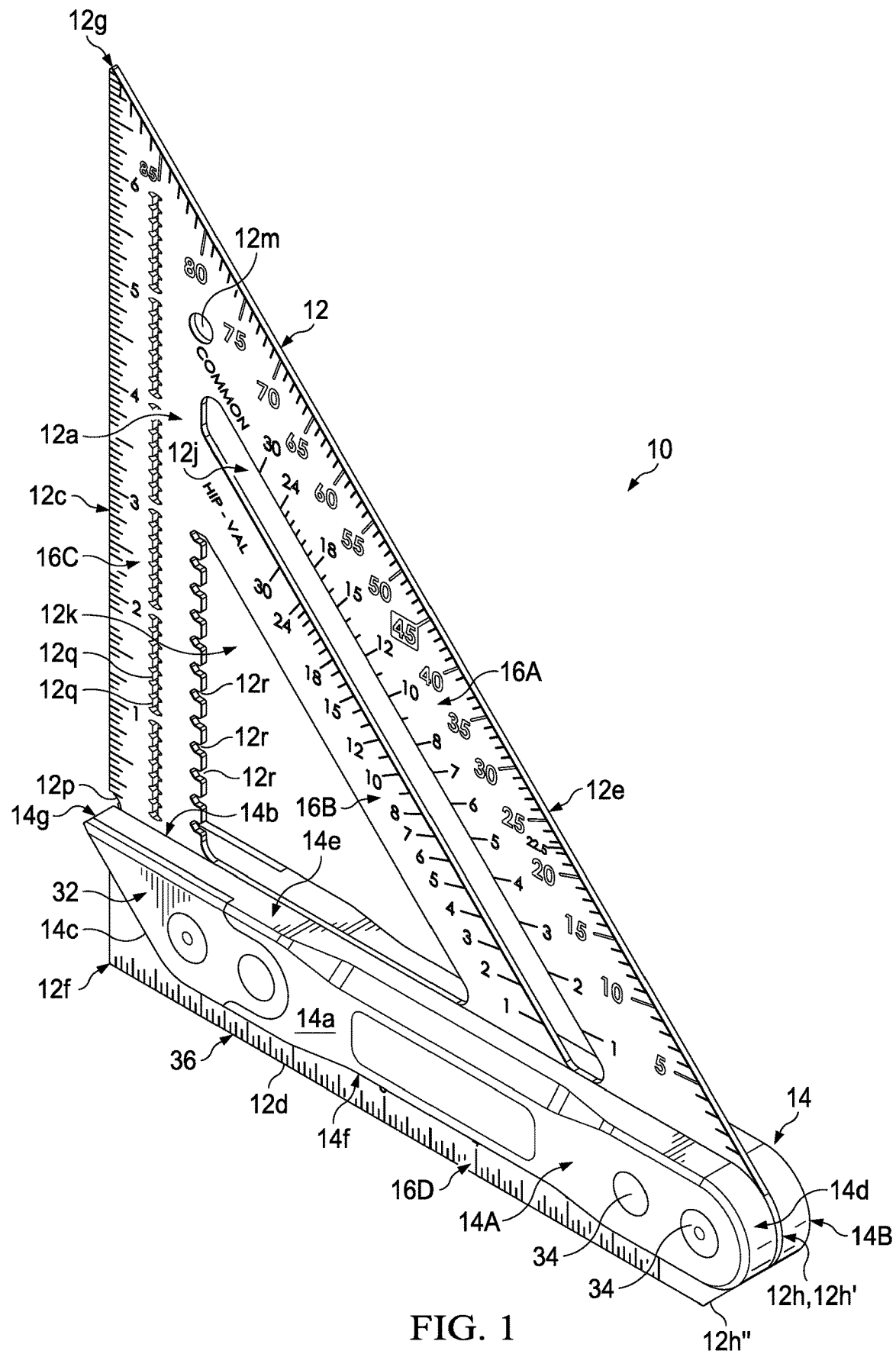
FIG. 1 is a top, front, right side perspective view of a first embodiment of a carpenter square in accordance with an aspect of the present disclosure.
Figure 2:
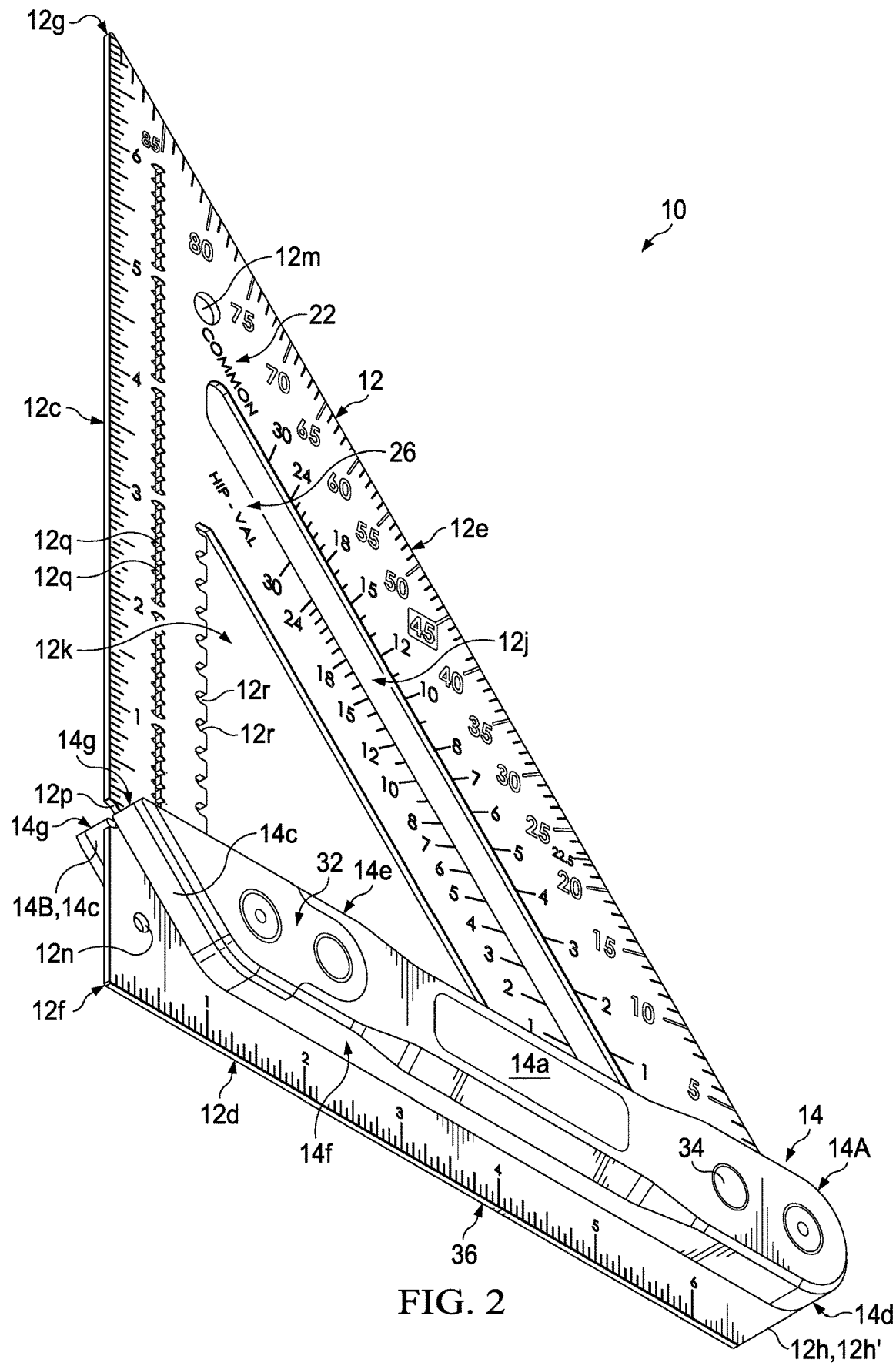
FIG. 2 is a bottom, front, left side perspective view of the carpenter square of FIG. 1.
Figure 3:
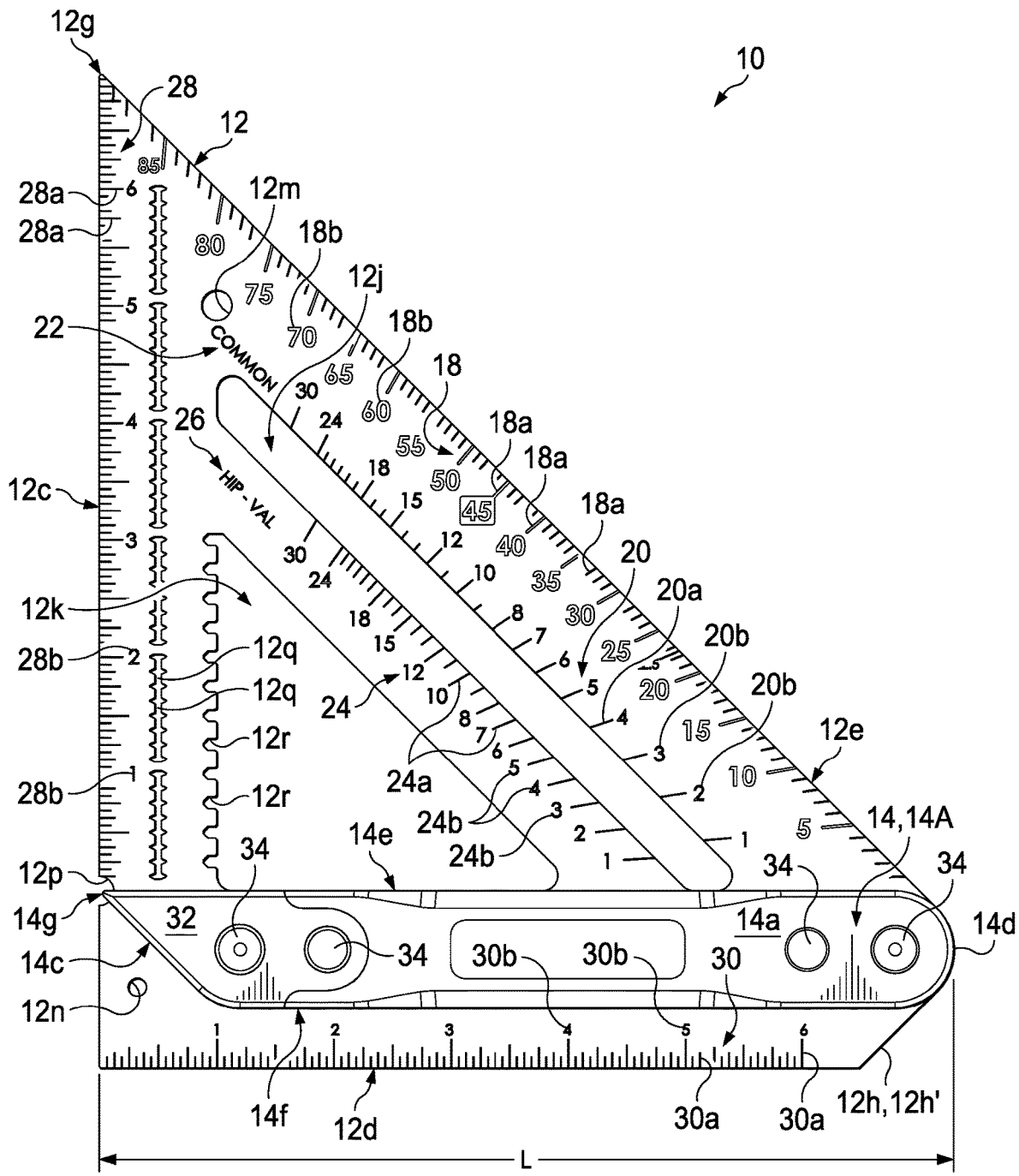
FIG. 3 is a front elevation view thereof.

As best seen in FIG. 3, plate 12 is configured as a right-angled triangle which includes a first side edge 12c, a second side edge 12d, and a hypotenuse 12e. The first surface 12a and second surface 12b extend between the first side edge 12c, the second side edge 12d, and the hypotenuse 12e. One or both of first surface 12a and second surface 12b may be treated to produce a matte finish thereon so that various markings and indicia provided thereon are more easily seen. First side edge 12c and second side edge 12d of plate intersect at a first corner 12f that is right-angled. First side edge 12c and hypotenuse 12e intersect at a second corner 12g that is a 45° corner. Second side edge 12d and hypotenuse 12e would typically intersect at another 45° corner, however, in plate 12, the intersection of second side edge 12d and hypotenuse 12e is indicated as region 12h which includes a convexly curved region 12h' originating in hypotenuse 12e and a straight edge 12h" originating in second side edge 12d and terminating in curved region 12h'. As such, what would typically be a 45° angle at the intersection of second side edge 12d and hypotenuse 12e is, instead, a truncated corner 12h.

Triangular plate 12 defines a slot 12j, an aperture 12k, a first hole 12m, and a second hole 12n (FIG. 2) therein, wherein each of these openings in plate 12 extend from first surface 12a through to second surface 12b. Slot 12j is disposed a distance inwardly from hypotenuse 12e such that a first plate section 16A (FIG. 4) is located between slot 12j and hypotenuse 12e. Slot 12j originates at an origin end 12j' a distance inwardly from first side edge 12c and terminates in a terminal end 12j" a similar distance inwardly from second side edge 12d.

As illustrated, aperture 12k is generally triangular in shape and is bounded and defined by a first inner edge 12k', a second inner edge 12k", and hypotenuse 12k'". It will be understood that in other embodiments, aperture 12k may be differently configured, such as being square or rectangular in shape. A second plate section 16B (FIG. 4) of plate 10 is located between the hypotenuse 12k'" bounding aperture 12k and the slot 12j. A third plate section 16C is located between first side edge 12c and the first inner edge 12k' of aperture 12k and the origin end 12j' of slot 12j proximate first side edge 12c. Finally, a fourth plate section 16D is located between second inner edge 12k" of aperture 12k and the terminal end 12j" of slot 12j.

First hole 12m is located inwardly from hypotenuse 12e and the origin end 12j' of the slot 12j. In one embodiment, as illustrated, first hole 12m is located in general alignment with first inner edge 12k' bounding aperture 12k and the origin end 12j' of slot 12j, and is spaced a distance away from the origin end 12j' of slot 12j moving in a direction towards the hypotenuse 12e. Second hole 12n is located in fourth plate section 16D a distance inwardly from first side edge 12c and a distance inwardly from second side edge 12d.

Figure 3A:
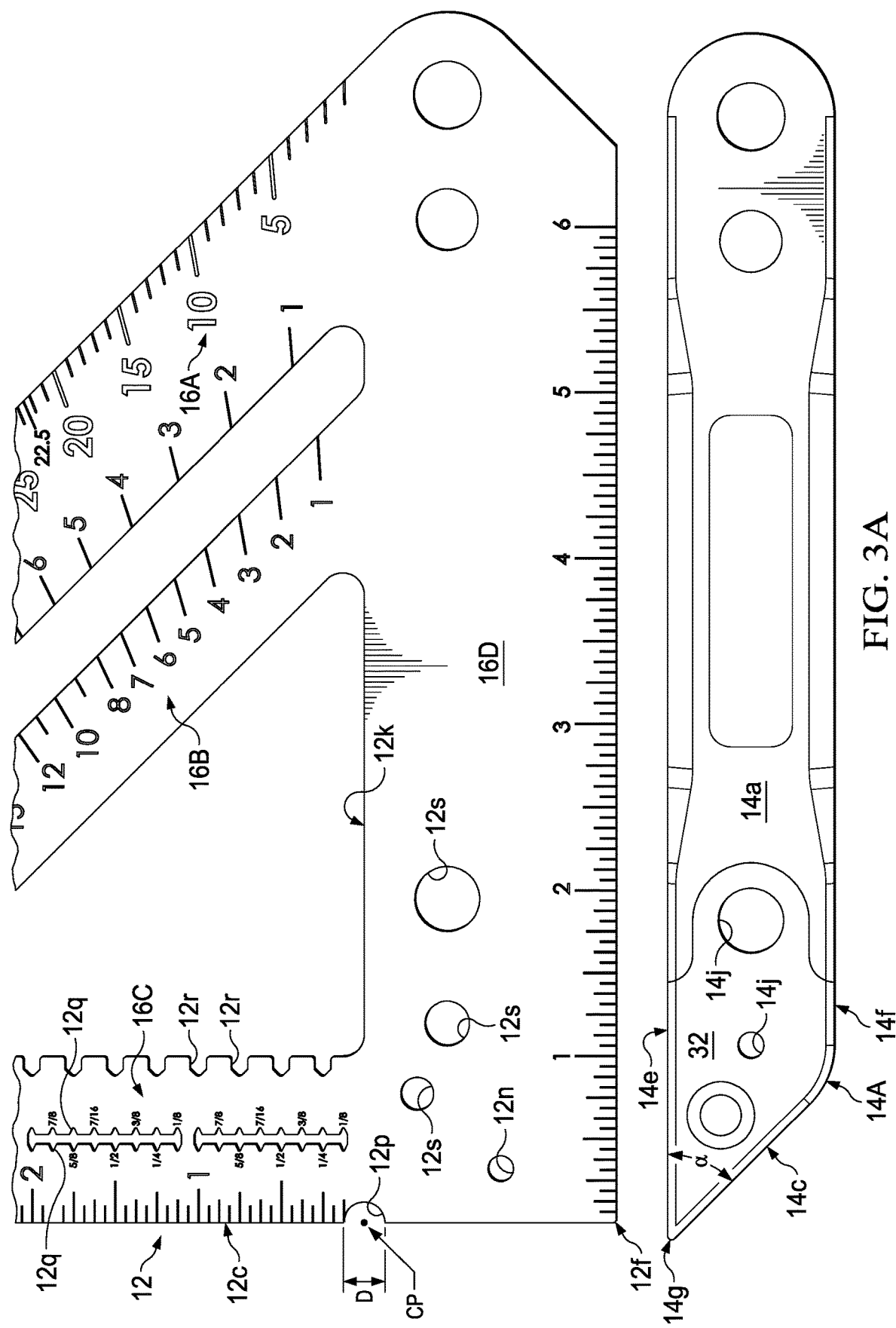
FIG. 3A is a partial enlarged exploded front elevation view of the carpenter square shown in FIG. 3.

Referring to FIG. 3A, a semi-circular pivot notch 12p is defined in plate 12 and extends between first surface 12a and second surface 12b. Pivot notch 12p originates in first side edge 12c and curves inwardly into plate 12. Pivot notch 12p is located in first side edge 12c generally at the intersection of third plate section 16C and fourth plate section 16D. FIG. 3A shows that pivot notch 12p has an imaginary center point "CP" and a diameter "D". In one embodiment, the diameter "D" is ¼ inch in length and therefore the radius of the pivot notch 12p measured from the center point "CP" to the curved edge which defines the notch is ⅛ inch.

Figure 3B:
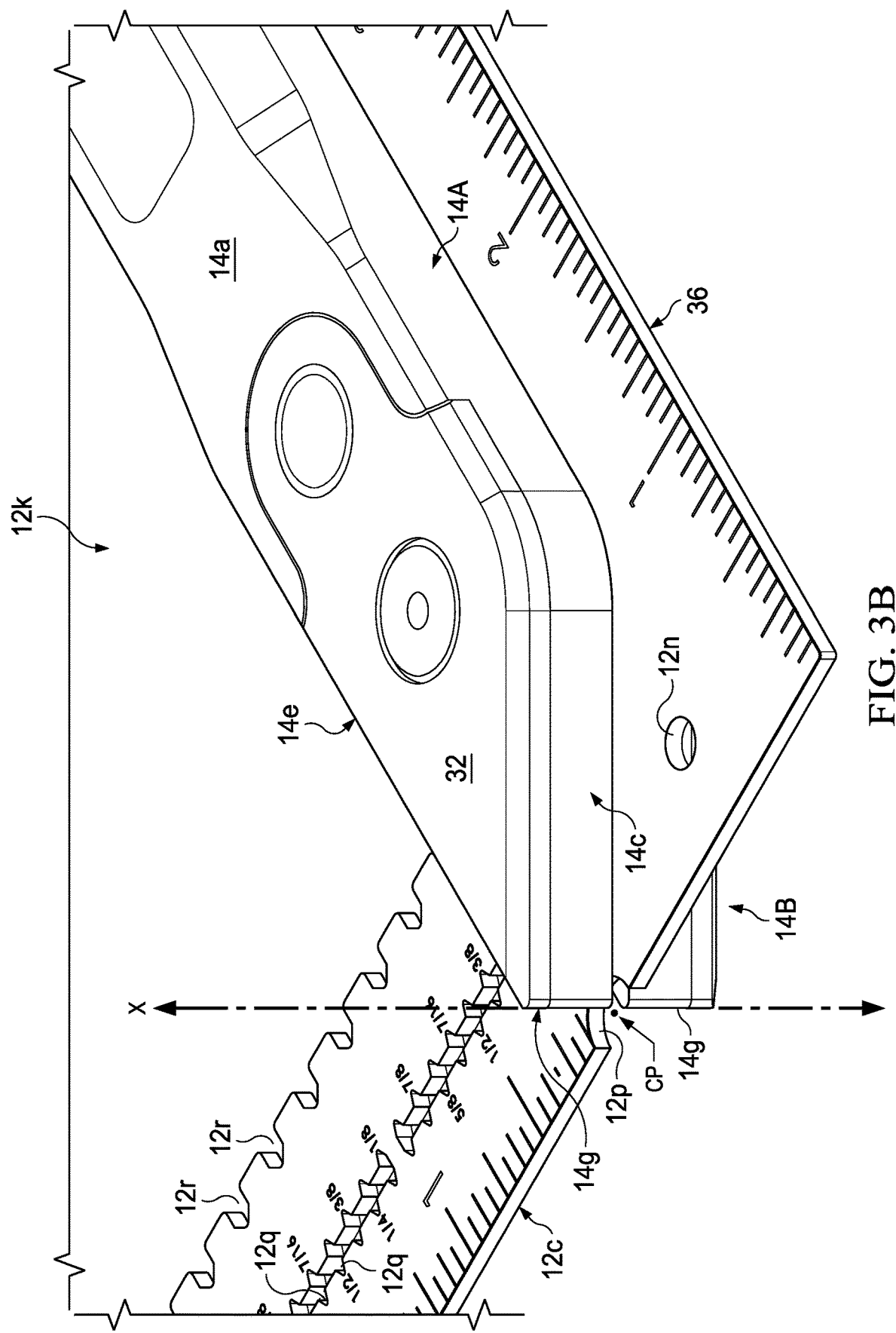
FIG. 3B is a partial enlarged top, front, left side perspective view of the carpenter square shown in FIG. 3.

Referring still to FIGS. 3 through 3B, plate 12 further includes a full range of first scribing guides 12q and a full range of second scribing guides 12r. First scribing guides 12q and second scribing guides 12r extend between first surface 12a and second surface 12b of plate 12. First scribing guides 12q are arranged in a row that is located along a midline of third plate section 16C. The row of first scribing guides 12q is oriented parallel to first side edge 12c of plate 12 and extends from a short distance inwardly from hypotenuse 12e proximate second corner 12g in a direction moving towards second side edge 12d. The row of first scribing guides 12q terminates proximate where third plate section 16C transitions to fourth plate section 16D. The first scribing guides 12q are on ⅛ inch centers and extend all the way from ⅛ inch through to 6 inches. First scribing guides 12q are useful when performing finer carpentry work. Each first scribing guide 12q includes two opposed triangular notches so that the carpenter can insert a finer tipped marking implement therein and either push or pull the carpenter square 10 along a workpiece to mark a line parallel to an edge of the workpiece. The triangular notches accommodate a wide variety of marking implements, from wooden and mechanical pencils through to scratch awls and permanent markers. The triangular notches of the first scribing guides 12q can best be seen in FIG. 3.

Second scribing guides 12r are cut at regular intervals along first inner edge 12k' bounding and defining aperture 12k. Second scribing guides 12r are particularly useful when working with construction lumber, such as when framing. The second scribing guides 12r are shaped and sized to readily accept a tip of a carpenter pencil therein. Second scribing guides 12r are on ¼ inch centers from ¼ inches through to 3 inches.

The purpose of the various openings 12j, 12k, 12m, 12n, 12p, 12q, and 12r will be described in detail later herein.

In accordance with various aspects of the present disclosure, a plurality of different markings and indicia are provided on first surface 12a of plate 12. Each group of associated markings and indicia form a scale that may be used to measure angles and/or distances on a workpiece (as will be discussed later herein). Each group of markings and indicia is provided for a different purpose (as will be discussed later herein). FIGS. 1 through 4 illustrate the various markings and indicia in Imperial units but it will be understood that in other embodiments, the various markings and indicate may be provided in Metric units. In yet other embodiments, plate 12 may include one set of markings and indicia in Imperial units and another set of markings in Metric units. In one embodiment, for example, first surface 12a may be provided with markings and indicia indicating Imperial units while second surface 12b may be provided with markings and indicia indicating Metric units, or vice versa. The markings and indicia illustrated in the attached drawings and discussed hereafter should be understood as being exemplary only and should not necessarily be considered to limit the scope of the present disclosure.

In accordance with one aspect of the present disclosure, a first scale is provided on first plate section 16A proximate hypotenuse 12e, and is generally indicated as first scale 18 (FIG. 3). First scale 18 comprises a plurality of markings 18a and a plurality of indicia 18b. Markings 18a are arranged at regular, spaced-apart intervals oriented at various angles to hypotenuse 12e. In particular, the first scale 18 is graduated in sixteenths, not eighths as in previously known carpenter squares. Indicia 18b are arranged at regular, spaced-apart, graduated intervals associated with the markings 18a. The markings 18a proximate a middle region of hypotenuse 12e are oriented generally at right angles to the edge of plate 12 that comprises the hypotenuse 12e. Moving in either direction away from the middle of hypotenuse 12e and towards either of the second corner 12g or third corner region 12h, the markings 18a become angularly-oriented relative to the edge that is hypotenuse 12e, but the distance between adjacent markings 18a remains constant from second corner 12g to third corner region 12h. The markings 18a and indicia 18b represent angles ranging from 0° proximate third corner region 12h through to 90° proximate second corner 12g. Midway along the length of hypotenuse 12e is a marking 18a and indicator 18b representing 45°.

A second scale 20 is provided on an edge of first plate section 16A that bounds and defines a portion of slot 12j. Second scale 20 comprises a plurality of markings 20a arranged at spaced-apart graduated intervals along the edge of first plate section 16A, along with an associated plurality of indicia 20b indicating graduated intervals between the angles associated with the markings 20a. As indicated by the word "Common" at 22 in FIG. 3, second scale 20 measures common pitch angles, particularly common rafter pitch angles. As illustrated, second scale 20 measures common pitch angles ranging from 1/12 through to 30/12, i.e., 1 in 12 roof slope (rise-in-run) through to 30 in 12 roof slope.

A third scale 24 is provided on second plate section 16B on the opposite edge of plate 12 which defines slot 12j. Third scale 24 comprises a plurality of markings 24a arranged at spaced-apart graduated intervals along the edge of second plate section 16B, along with an associated graduate plurality of indicia 24b indicating angles associated with markings 24a. The word "Hip-Val", indicated by the number 26 and provided on second plate section 16B proximate the origin end 12j' of slot 12j indicates that the angles represented by markings 24a and indicia 24b are those typically associated with measuring Hip and Valley rafter pitch. Third scale 24 as illustrated includes markings 24a and indicia 24b ranging from 1/12 through 30/12.

A fourth scale 28 is provided on third plate section 16C. Fourth scale 28 comprises a plurality of markings 28a arranged at spaced-apart graduated intervals along the first side edge 12c of third plate section 16C, along with an associated graduate plurality of indicia 28b indicating distance associated with various marking 28a on the fourth scale 28. It should be noted that the markings 28a and indicia 28b associated with first side edge 12c of plate 12 apply equally to the first scribing guides 12q defined in third plate section 16C. Each individual first scribing guide 12q is associated with a regular interval between adjacent markings 28a of fourth scale 28. Furthermore, the markings 28a and indicia 28b associated with fourth scale 28 apply equally to the second scribing guides 12r defined on the edge 12k' of third plate section 16C. Each of the second scribing guides is associated with a different regular interval between adjacent markings 28a of fourth scale 28 from those with which the first scribing guides 12q are associated. It should be noted that the interval between adjacent second scribing guides 12r is greater than the interval between adjacent first scribing guides 12q.

Similarly, a fifth scale 30 is provided on fourth plate section 16D. Fifth scale 30 comprises a plurality of markings 30a arranged at spaced-apart graduated intervals along the second side edge 13d of fourth plate section 16D, along with an associated graduated plurality of indicia 30b indicating the distances associated between markings 30b. Both of the fourth scale 28 and fifth scale 30 are effectively rulers useful for measuring distances relative to first corner 12 with the shortest distance being closest to first corner 12f (for both the fourth scale 28 and fifth scale 30) and the greatest distance being located closest to second corner 12g (for fourth scale 28) and to third corner region 12h (for fifth scale 30).

Referring to FIGS. 1-8, base 14 is provided for engagement with plate 12. In particular, base 14 is engaged with fourth plate section 16D of plate 12. Base 14 comprises a first base section 14A and a second base section 14B that are substantially identical to one another and are secured to opposite sides of plate 12 as mirror images of one another.

As illustrated, first base section 14A is placed in abutting contact with first surface 12a and second base section 14B is placed in abutting contact with second surface 12b of plate 12.

Since first base section 14A and second base section 14B are identical, only first base section 14A will be described in further detail herein but it should be understood that the description applies equally to second base section 14B. First base section 14A comprises a generally rectangular housing. Most of the housing is fabricated from aluminum. However, one of the two end regions of the housing, indicated in FIG. 1 as end region 32, is reinforced with stainless steel. First base section 14A, including end region 32 includes a first surface 14a, an opposed second surface 14b, a first side 14c, a second side 14d, a first end 14e, and a second end 14f. It should be noted that the outside corners of first base section 14A and second base section 14B are chamfered and present no sharp edges so that the base 14 is comfortable for a carpenter to handle and manipulate the carpenter square 10 via base 14.

Referring to FIG. 3A first base section 14A is shown exploded away from plate 12. In accordance with an aspect of the present disclosure, first side 14c of first base section 14A intersects the first end 14e of first base section 14A in such a way as to form a V-shaped region, the apex of which is a pivot corner 14g. First side 14c is oriented at an angle α relative to first end 14e. In one embodiment, the angle α is less than 90°. In one embodiment the angle α is between about 45° and 90°. In one embodiment, the angle α is 45°. In one embodiment, the angle α is less than 45°.

As best seen in FIG. 3, the pivot corner 14g provided on base 14 is located generally centrally within pivot notch 12p defined by plate 12. FIG. 3B shows that second base section 14B similarly presents a pivot corner 14g that aligns with the pivot corner 14g on first base section 14A. When base 14 is secured to plate 12, the two pivot corners 14g are located in alignment with one another and with the imaginary center point "CP" of pivot notch 12p on plate 12. In particular, the two corners 14g, 14g and the imaginary center point "CP" align along a pivot axis "X", for reasons that will become evident later herein. In other words, a small V-shaped region of base 14 extends outwardly beyond the curved edge of plate 12 that defines the pivot notch 12p, and part of the pivot notch 12p is defined on either side of the aligned corners 14g of base 14. The arrangement of the pivot notch 12p and the corners 14g of the base 14, enables the carpenter square 10 to be pivoted about an axis "X" in circumstances that will be discussed later herein. Pivoting of square 10 about the axis "X" running through corners 14g is enhanced because corners 14g are not a right-angled corners but are, instead preferably 45° corners.

Corners 14g are provided on the ends of the first base section 14A and second base section 14B that each include a stainless-steel reinforced end region 32. The reinforcing applied to each corner 14g by the associated end region 32 aids in reducing wear on corners 14g and therefore increases the life of the carpenter square 10.

Referring to FIG. 3, first base section 14A further defines a rounded second corner 14h where first side 14c intersects with second end 14f. FIG. 3 shows that the second side 14d of first base section 14A is rounded. In particular, second side 14d has a radius of curvature substantially identical to the radius of curvature of convexly curved region 12h' of the third corner region 12h of plate 12. This configuration gives the region of carpenter square 10 proximate second side 14d and convexly curved region 12*h'* an aesthetically pleasing arcuate appearance that can readily be seen in FIGS. 1 and 9, for example.

Fourth base section 16D defines a plurality of through-holes 12*s* (FIG. 3A) therein that align with through-holes 14J defined in first base section 14A and second base section 14B. Fasteners 34 extend through the aligned through-holes 12*s*, 14*j* to secure first and second base sections 14A, 14B to plate 12.

Figures 5, 6:
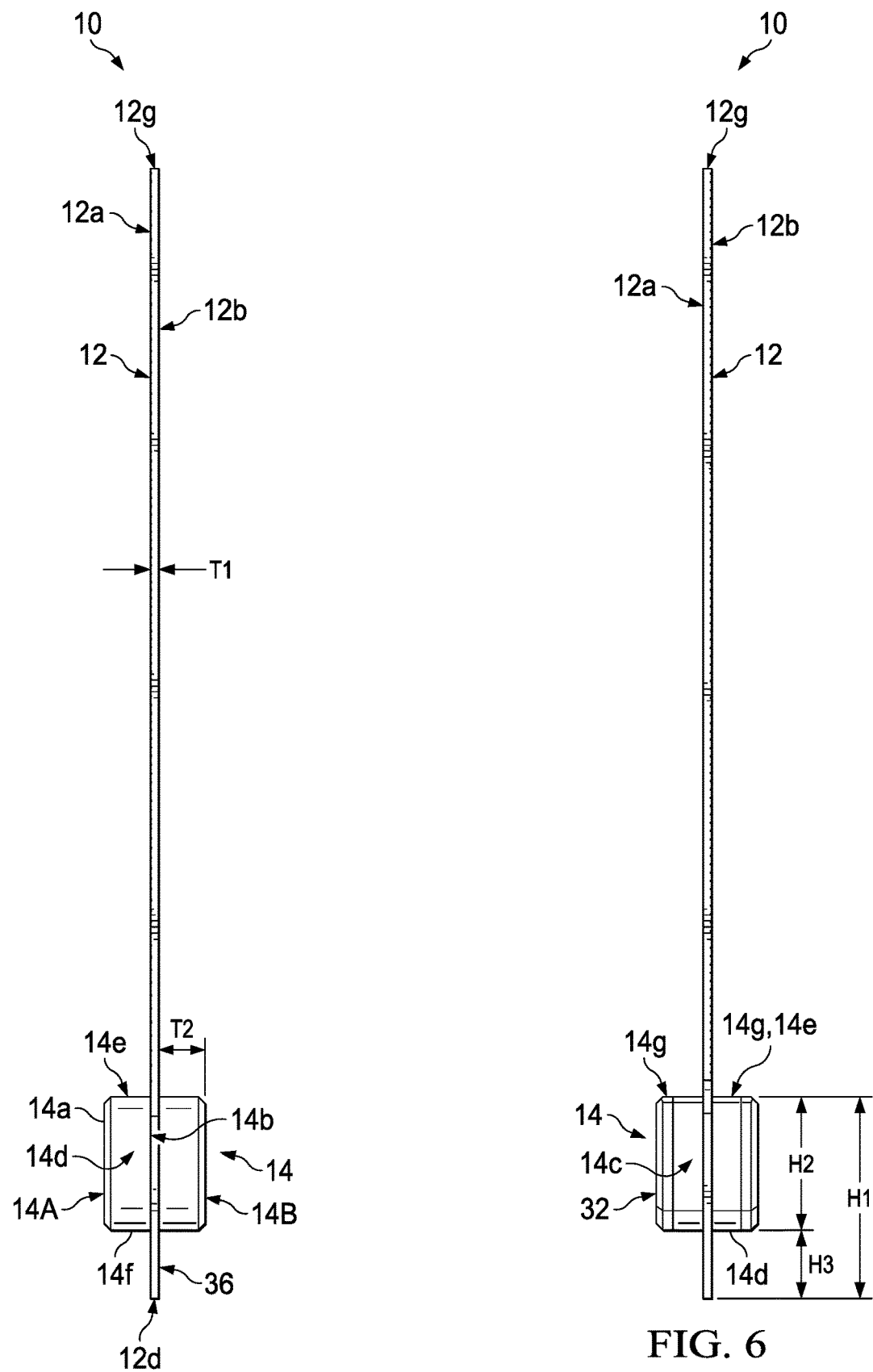
FIG. 5 is a right side elevation view thereof.
FIG. 6 is a left side elevation view thereof.

As best seen in FIG. 3, fourth plate section 16D and base 14 are of substantially a same length "L". FIGS. 4-6 show the fourth plate section 16D of plate 12 is of a height "H1" measured between edge 12*k''* of plate 12 which defines aperture 12*k* and the second side edge 12*d* of plate 12. First base section 14A is of a height "H2" measured between first end 14*e* and second end 14*f*. Height "H2" is smaller than the height "H1". In one embodiment, height "H2" of base 14 is about 1 inch. Fifth scale 30 is located in the region of plate 12 that extends outwardly beyond the second end 14*f* of first base section 14A. The region of the plate 12 extending outwardly beyond second end 14*f* of base 14 is referred to hereafter as the "blade" and is indicated by reference number 36 in FIGS. 4 and 5. Blade 36 is of a height "H3". In one embodiment, the height "H3" is about half an inch. FIG. 5 shows that the entire plate 12 is arranged in a same plane. A first region of the plate 12 extends outwardly in a first direction away from the first end 14*e* of base 14 and a second region of the plate 12 extends outwardly in a second direction away from the second end 14*f* of the base 14, however, the first region and second region are in the same plane as one another.

While fourth base section 16D (and therefore blade 36) has been described above as being an integral part of plate 12, in other instances, fourth base section 16D may be a separate plate from plate 12. This separate plate may be secured to one or both of first and second base sections 14A, 14B in a similar manner to how plate 12 is secured to first and second base sections 14A, 14B. In these instances, the second side edge end of plate 12 may be configured to abut an end of the separate plate in any suitable manner.

Referring still to FIG. 5, plate 12 is of a first thickness "T1" measured between first surface 12*a* and second surface 12*b* of plate. First thickness "T1" is about one third the thickness of previously known carpenter squares. In one embodiment, the first thickness "T1" of plate 12 is 1/16 inch. This thinner plate 12 ensures that the markings on the various scales on plate 12 are located closer to the workpiece that is to be marked than was the case in previously known carpenter squares. The thinner plate 12 thereby tends to increase accuracy when carpenters are marking their workpieces. First base section 14A is of a second thickness "T2", measured between first surface 14*a* and second surface 14*b* of first base section 14A (or second base section 14B). The second thickness "T2" of first base section 14A is substantially greater than the first thickness "T1" of plate 12. The overall thickness of base 14 when engaged with plate 12 is about ⅝ inch thick.

Plate 12 preferably is machined from stainless steel. As mentioned in the previous paragraph, the stainless steel preferably is of a thickness of 1/16 inch. The edges of plate 12 are machined on CNC mills to a tolerance of 0.0085 inches. Additionally, the markings and indicia of the first scale 18, second scale 20, third scale 24, fourth scale 28, fifth scale 30, and words 22, 26 preferably are laser engraved into plate 12. The thinner steel plate and laser engraving helps to reduce parallax viewing errors and as a consequence measurement transfer to the carpenter's workpiece tends to be more precise than was possible with previously known carpenter squares.

Additionally, the slot 12*j*, aperture 12*k*, first scribing guides 12*q*, second scribing guides 12*r* and holes 12*m*, 12*n*, and pivot notch 12*p* are cut by laser into the plate 12 to ensure optimum accuracy for a craftsman using square 10. The laser cutting of the markings and indicia into plate 12 helps to ensure that the markings and indicia are in the correct location, are clearly readable, and will not fade over time. By contrast, PRIOR ART carpenter squares had markings and indicia stamped into the surface of the square making the tools less accurate. Additionally, over time, the markings and indicia tend to wear off the PRIOR ART squares, making the tools quite useless.

Carpenter square 10 is particularly useful for all types of woodworking operations including but not limited to furniture making, cabinet making, construction, and roof rafter framing.

Figure 9:
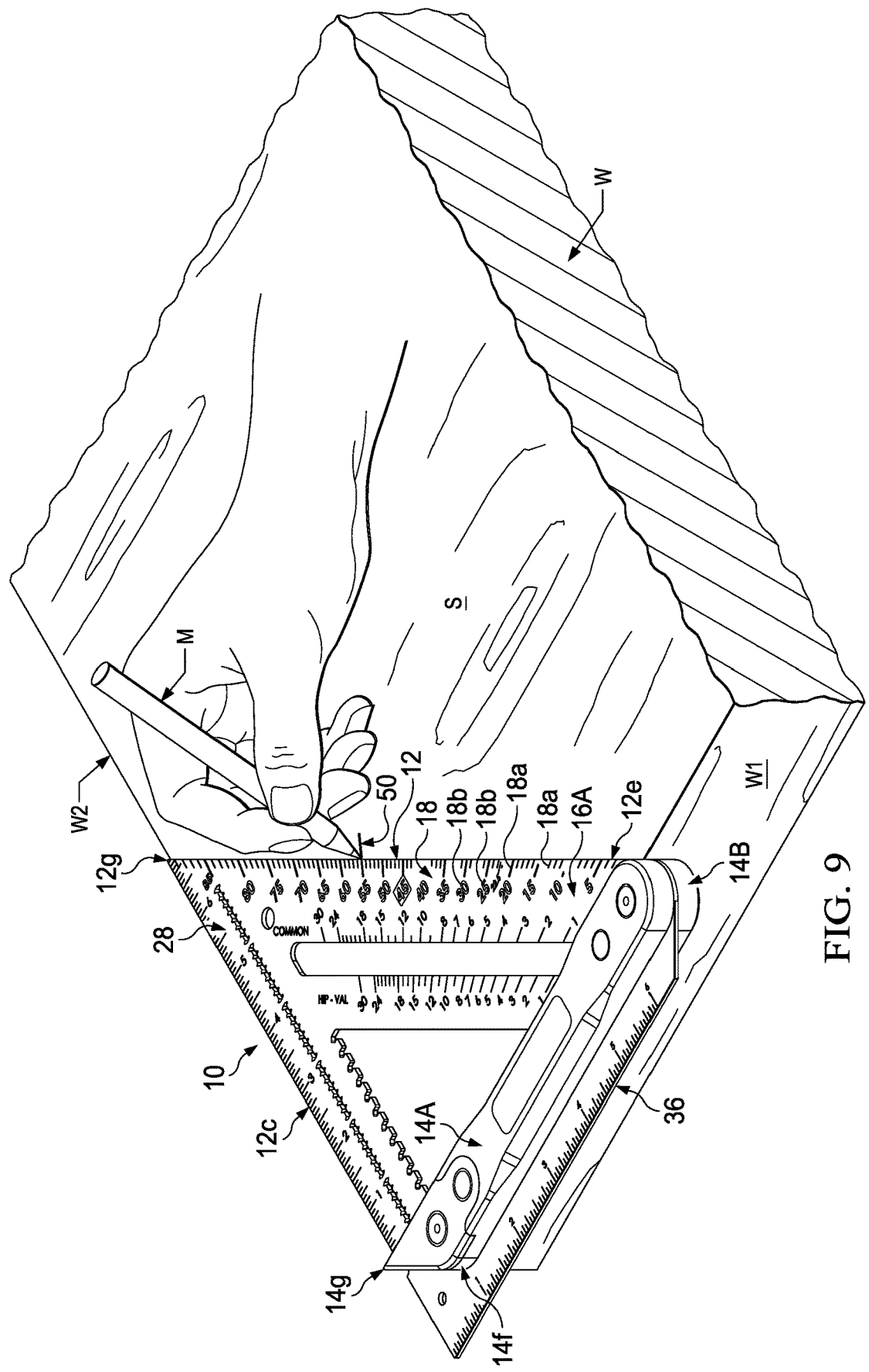
FIG. 9 is a first operational view of the carpenter square in use.

FIGS. 9 through 14 illustrate a sample of different ways in which carpenter square 10 may be utilized. FIG. 9 shows a carpenter using carpenter square 10 to transfer measurements onto a surface "S" of a workpiece "W" using a marking implement "M". In particular, square 10 is positioned such that the second surface 12*b* (FIG. 4) of plate 12 is placed in abutting contact with the surface "S" to be marked. Square 10 is moved on surface "S" so that the base 14 of square 10 abuts the first side wall "W1" of the workpiece "W" and the first side edge 12*c* of plate 12 is aligned with an edge located along the intersection of surface "S" with a second side wall "W2" of the workpiece "W". In particular, the second base section 14B will contact the first side wall "W1" while the second surface 12*b* of the plate 12 rests on surface "S". The square 10 is then retained in place on surface "S". The carpenter uses first scale 18 on first plate section 16A of square 10 to select a particular one of the markings 18*a* and/or indicia 18*b* associated with an angle they wish to transfer onto surface "S". Using their marking implement "M", the carpenter will mark the surface "S". As illustrated, the carpenter has drawn a line 50 on the surface ""S" which aligns with the angle marking on first scale 18 that was selected. After the line 50 has been placed on surface "S", the square 10 is lifted off surface "S" or is moved to a second location to transfer a different measurement to the workpiece ""W".

It should be understood that in other instances, not illustrated herein, that when square 10 is placed on the surface "S" in a similar fashion to the manner illustrated in FIG. 9, but the first side edge 12*c* of plate 12 is not aligned with the edge at the intersection of surface "S" and the second side wall "W2" of the workpiece "W", the carpenter may draw a straight line onto the surface "S" using the first side edge 12*c* as a guide or using hypotenuse 12*e* as a guide. The carpenter may further use first side edge 12*c* to measure distance from the first side wall "W1" using fourth scale 28. Still further, the carpenter may mark a right angle onto the surface "S" by drawing a line using first side edge 12*c* as the guide. A line marked in this latter fashion will be oriented at right angles to the first side wall "W1" of the workpiece.

Figure 10:
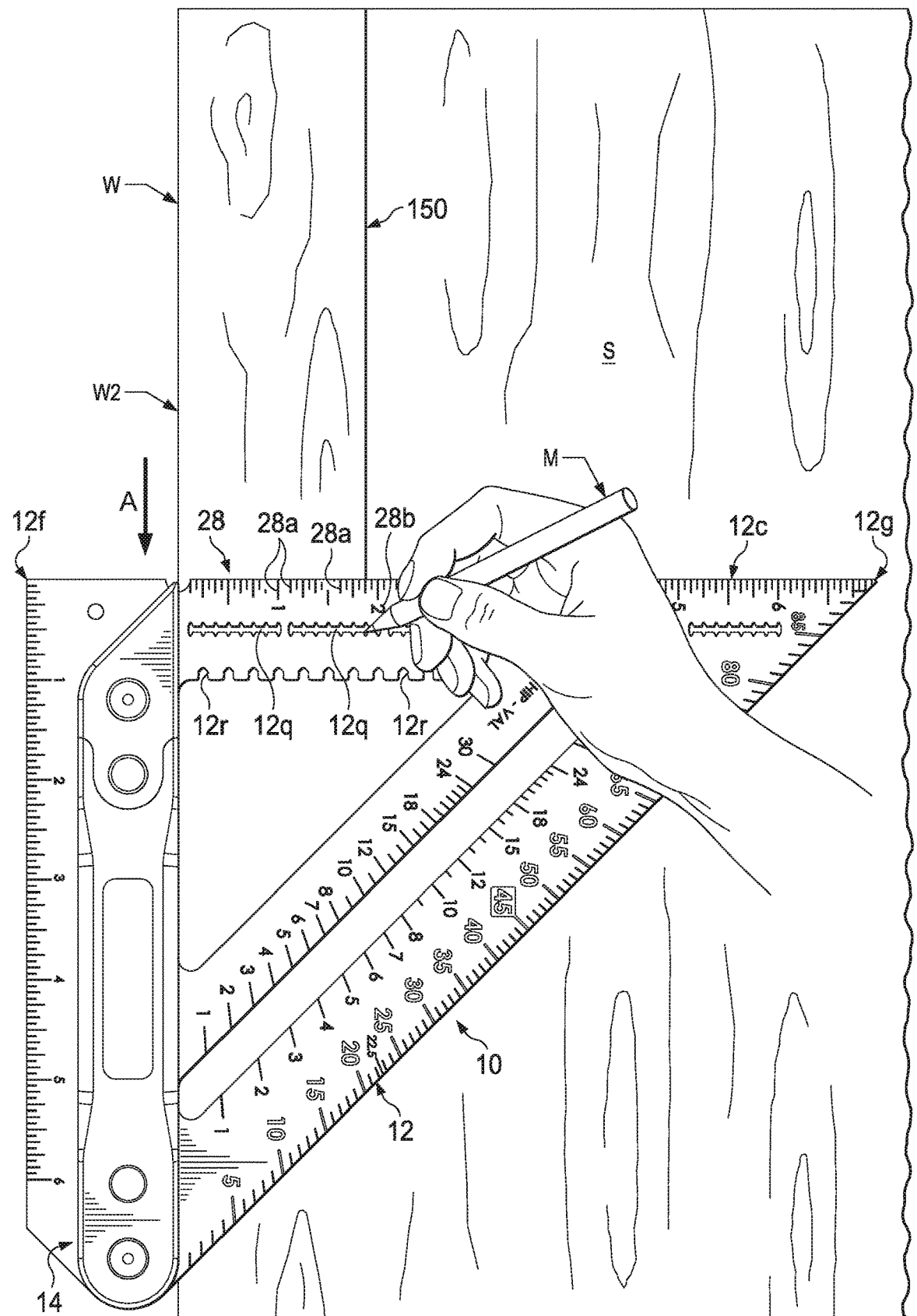
FIG. 10 is a second operational view of the carpenter square in use.

FIG. 10 shows a further use of carpenter square 10 in accordance with an aspect of the present disclosure. In this particular instance, square 10 has been positioned such that the base 14 (particularly the first end 14*e* of second base section 14—FIG. 6) is placed in abutting contact with second side wall "W2" of workpiece "W" when plate 12 rests upon the surface "S" of the workpiece. The carpenter intends marking a line on the surface "S" that is parallel to the second side wall "W2" and spaced a set distance away from that second side wall "W2". The carpenter will use the fourth scale 28 provided on the plate 12 and will select a particular first scribing guide that aligns with a marking 28a or with indicia 28b located at the desired distance from second side wall "W2". The carpenter inserts the tip of the marking implement "M" into the selected one of the first scribing guides 12q provided on square 10 and, keeping the tip of the implement "M" engaged in the first scribing guide 12q, and keeping the plate 12 in contact with surface "S", will slide the square 10 along the second side wall "W2" of the workpiece "W". As indicated earlier herein, the first scribing guides 12q are configured in such a way that the carpenter may push or pull square 10 along surface "S". FIG. 10 shows the square 10 being pulled in the direction of arrow "A" along surface "S" while maintaining contact between base 14 and second side wall "W2". As the square is moved in this fashion, the marking implement will draw a scribing line 150 on surface "S". The line 50 is parallel to the second side wall "W2" of the workpiece.

Although not illustrated herein, it will be understood that the second scribing guides 12r may be used in substantially the same manner as first scribing guides 12q to allow a carpenter to mark a line parallel to the wide edge of a workpiece onto the surface of that workpiece. Because of the configuration of second scribing guides 12r, the tip of the marking implement "M" will be engaged in a selected one of the second scribing guides 12r and the square 10 will be pushed along the surface "S" (in the opposite direction to arrow "A" shown in FIG. 101.

It will be understood that in other embodiments, first scribing guides 12q may be configured in a manner similar to second scribing guides 12r and therefore the square will only be able to be moved across the surface in one direction (either pulling or pushing) instead of being potentially movable in either direction as disclosed herein.

It will further be understood that in other embodiments, second scribing guides 12r may be configured in a manner similar to first scribing guides 12q and therefore the square will enable the carpenter to push or pull (selecting either of these two actions) to mark a scribing line on the surface of the workpiece.

Figure 11A:
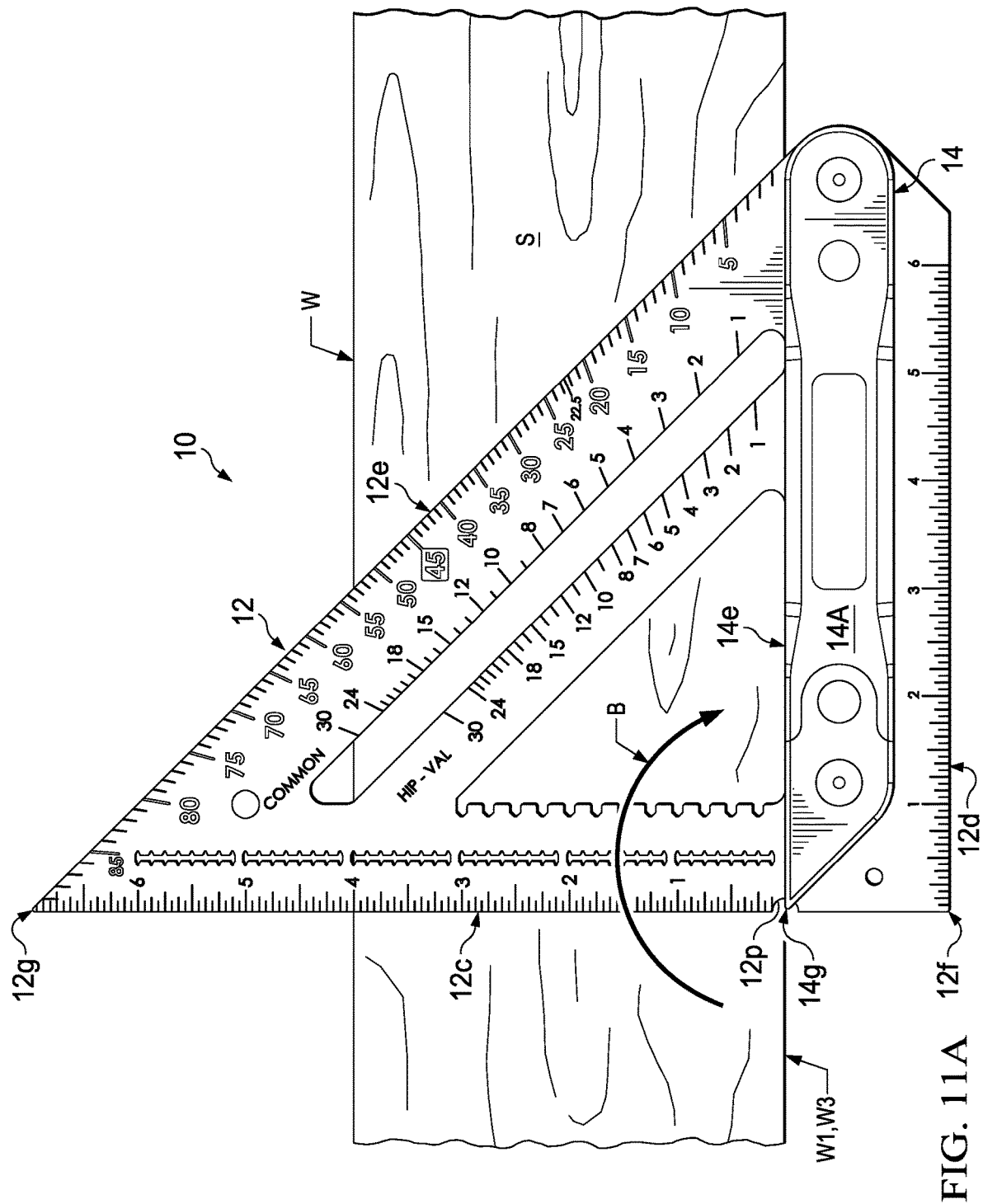
FIG. 11A is a third operational view of the carpenter square shown positioned on a workpiece in an initial position for marking an angle or rafter pitch position on the workpiece using the carpenter square.
Figure 11B:
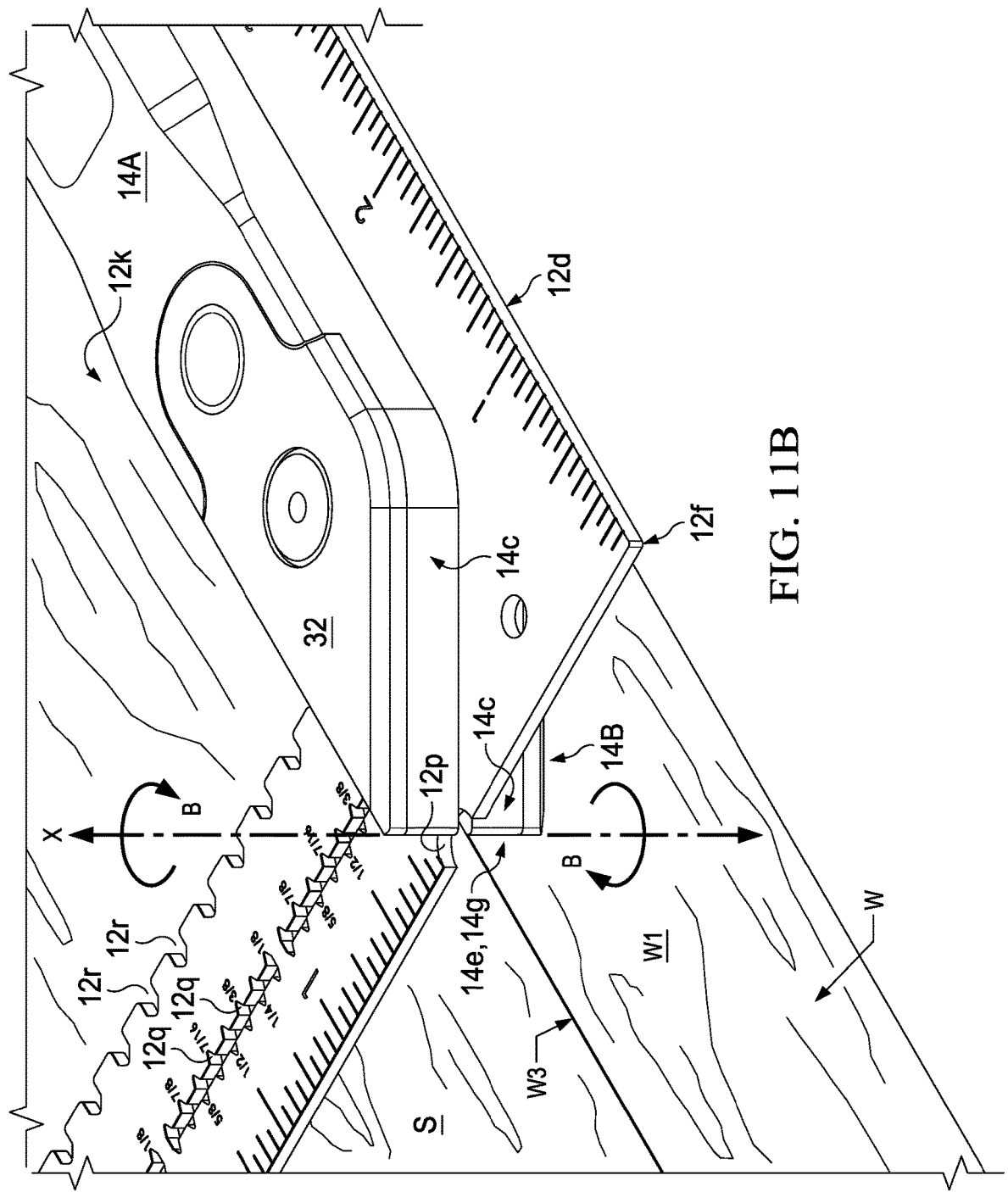
FIG. 11B is an enlarged partial view of the carpenter square taken in perspective, showing the carpenter square in the initial position with the reinforced corner of the base in contact with a side wall of the workpiece and in a position ready for pivoting relative to the side wall of the workpiece.
Figure 11C:
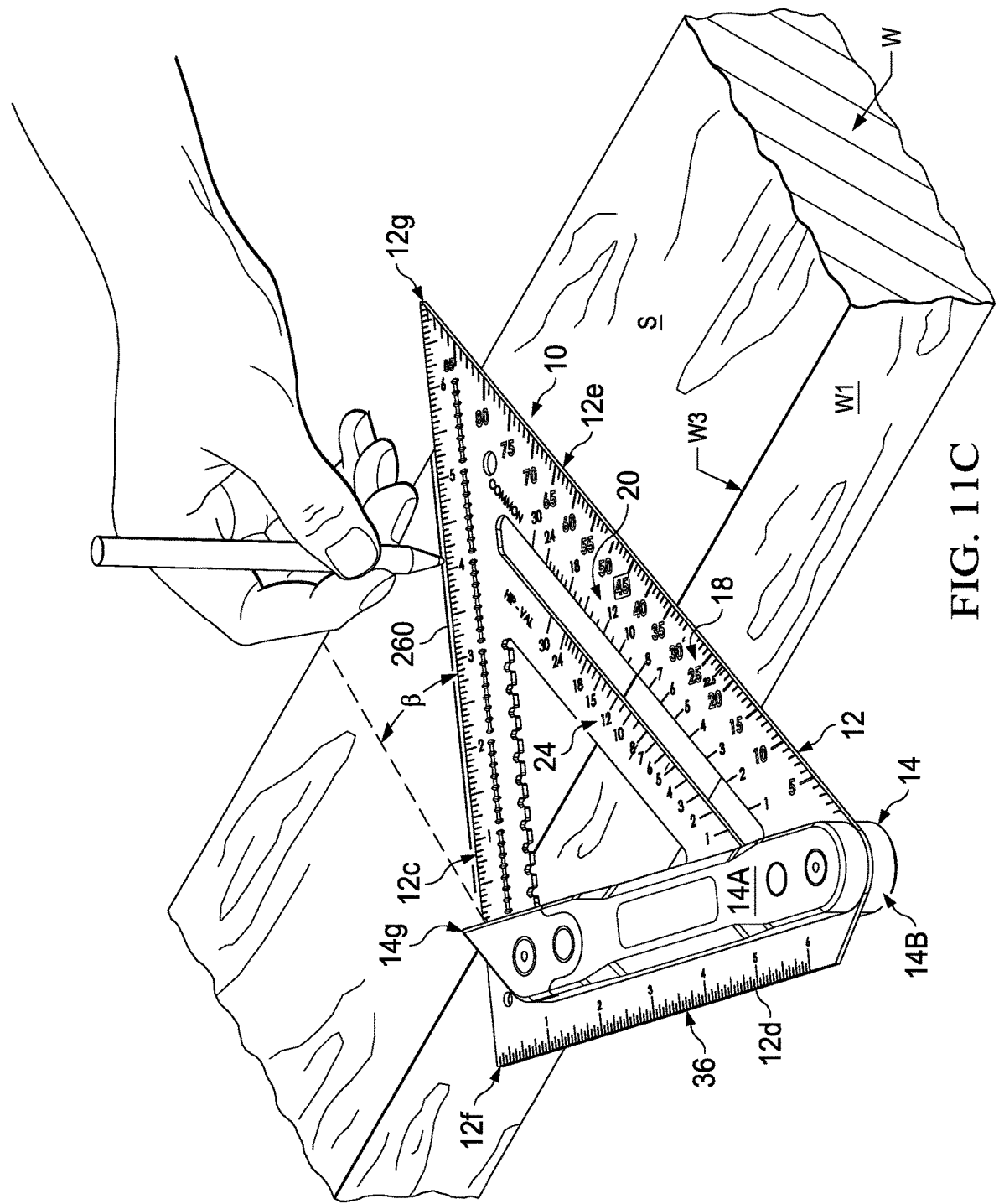
FIG. 11C is a top perspective view taken from a different angle relative to FIG. 11B, showing the carpenter square pivoted to align one of the angle markings on the plate of the carpenter square with an edge of the side wall of the workpiece, and showing the carpenter marking an angle line on the upper surface of the workpiece.

Referring now to FIGS. 11A through 11B there is illustrated a method of marking an angle on the upper surface "S" of workpiece "W" such as is required when the carpenter wishes to make an angle cut in the workpiece. FIG. 11A shows the carpenter square 10 in an initial position where plate 12 is in abutting contact with the upper surface "S" of workpiece "W" and the first end 14e of second base section 14B (see FIG. 11B) is in abutting contact along its length with first side wall "W1". FIG. 11B shows the carpenter square 10 in the initial position but as viewed from a different angle relative to FIG. 11A. In order to mark the angle measurement on the surface "S", the carpenter will pivot square 10 about the pivot axis "X" (FIG. 11B). Pivot axis "X" that runs along the two corners 14g of base sections 14A and 14B and is oriented normal to first surface 12a of plate and thereby to surface "S" (i.e., at right angles to surfaces 12a and "S"). The important thing to note is that in order to make the desired angle marking, the corner 14g of the second base section 14B must remain in abutting contact with the first side wall "W1" of the workpiece as carpenter square 10 is pivoted about the pivot axis ""X" in the direction indicated by arrow "B" in FIGS. 11A and 11B. The carpenter will pivot the square 10 about the axis "X" until the desired angle marking on a selected one of the first scale 18, second scale 20, and third scale 24 of square 10 aligns with the edge "W32" of the workpiece "W". (The edge "W3" is located along the intersection of surface "S" and first side wall "W1".) In particular, the carpenter will pivot square 10 through an angle Θ (FIG. 11C) to cause the desired angle marking to align with the edge "W3". For example, if the carpenter wants to simply mark an angle in degrees on the surface "S", he or she will pivot square 10 align a selected angle marking 18a on the first scale 18 with the edge "W3" of the workpiece "W" (continuously keeping contact between the corner 14g of second base section 14B and side wall "W1" as he or she does so). When the selected marking 18a is aligned with edge "W3", the carpenter will draw a line 250 on the surface "S" with the marking implement "M", using first side edge 12c of plate 12 as a guide. If the carpenter wishes to mark a common rafter pitch angle on the surface "S" of the workpiece, he or she will select to align one of the markings 22a from the second scale 22 with the edge "W3" of the workpiece, and will then draw a line 250 on the surface "S" using the first side edge 12c as the guide. If the carpenter wishes to mark a hip or valley rafter pitch angle on the surface "S", he or she will select to align one of the markings 24a from the third scale 24 with the edge "W3" of the workpiece "W". When the selected marking 24a aligns with the edge "W3", the carpenter will use the marking implement "M" to draw a line 250 on surface "S" using first side edge 12c of plate 12 as the guide.

Figure 12:
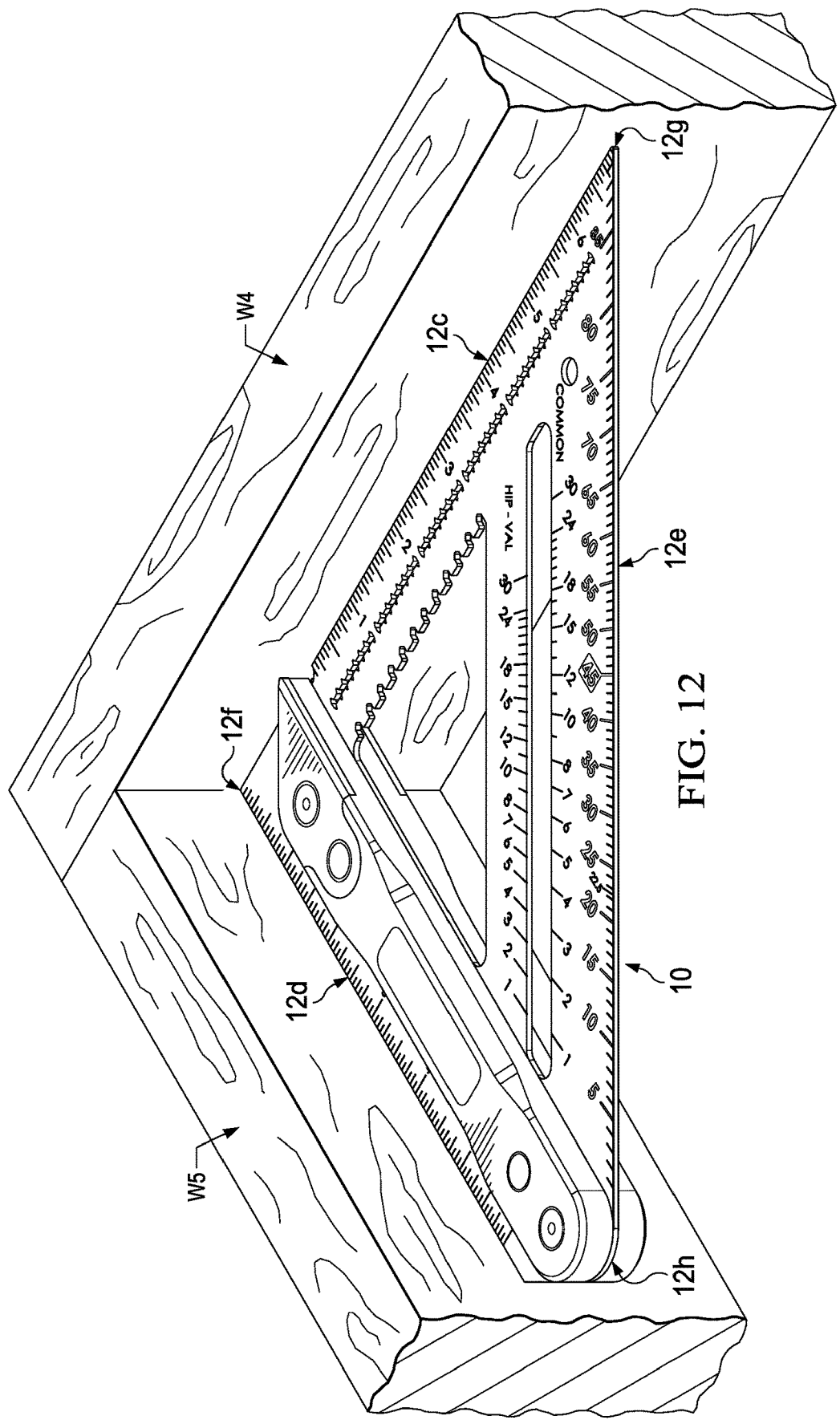
FIG. 12 is a fourth view of the carpenter square in use.

FIG. 12 shows a further use of carpenter square 10. In this instance, square 10 is being utilized to confirm whether two pieces of lumber, "W4" and "W5", are arranged at right angles to one another. In this particular instance, the first side edge 12c of square 10 is placed in contact with an interior surface of the first piece of lumber ""W4" and the second side edge 12d of square 10 is placed in abutting contact with the interior surface of the second piece of lumber "W5". The first corner 12f of square 10 is placed along a corner formed between the intersecting pieces of lumber "W4", "W5". Adjustments can be made to the position of one or both pieces of lumber to ensure that there is abutting contact between the lumber and the entire first and second sides 12c, 12d of plate 10. If this is done, then the carpenter can be sure that the two pieces of lumber "W4" and "W5" are oriented at right angles to one another.

Figure 13:
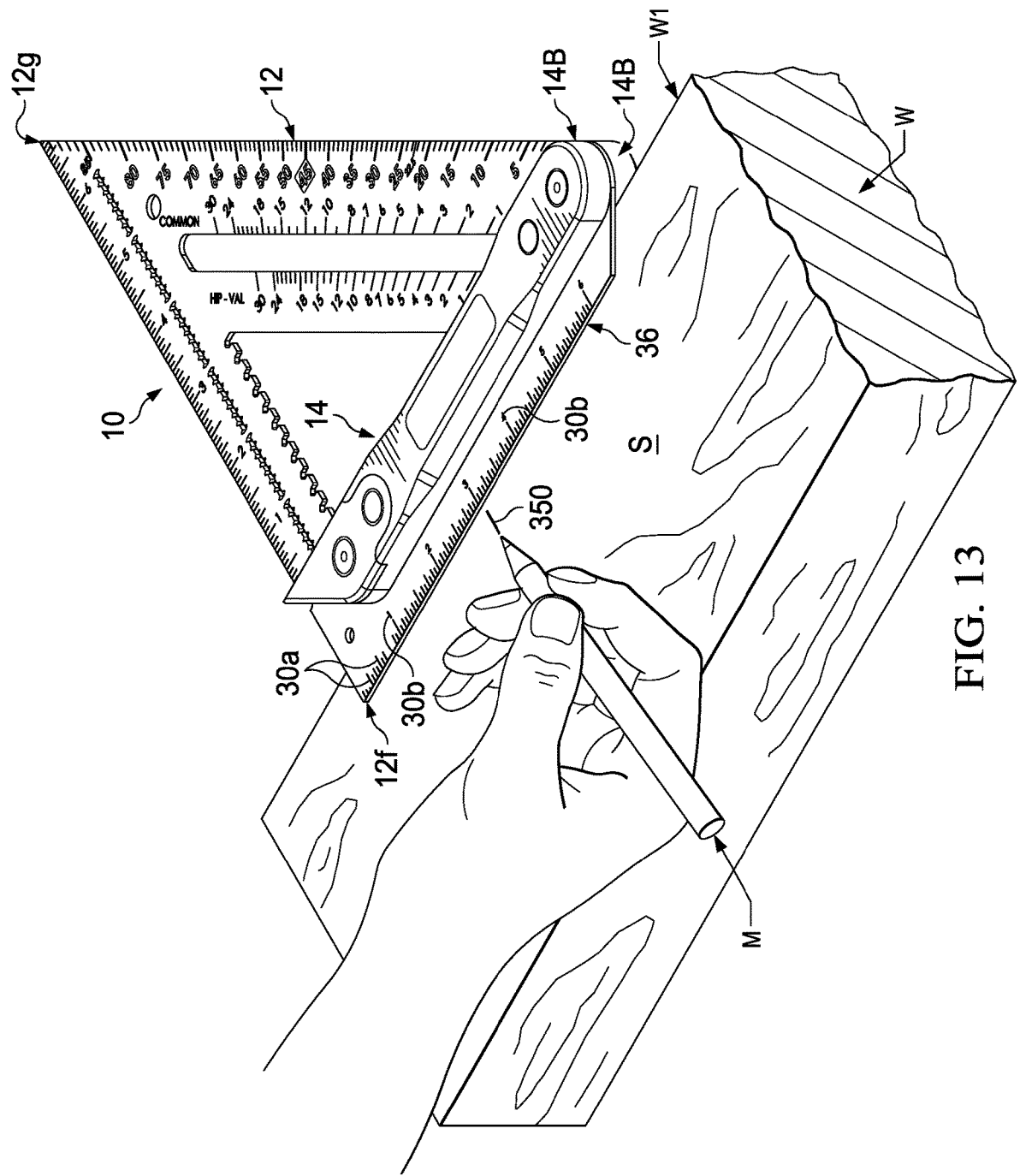
FIG. 13 is a fifth view of the carpenter square in use.
Figure 14:
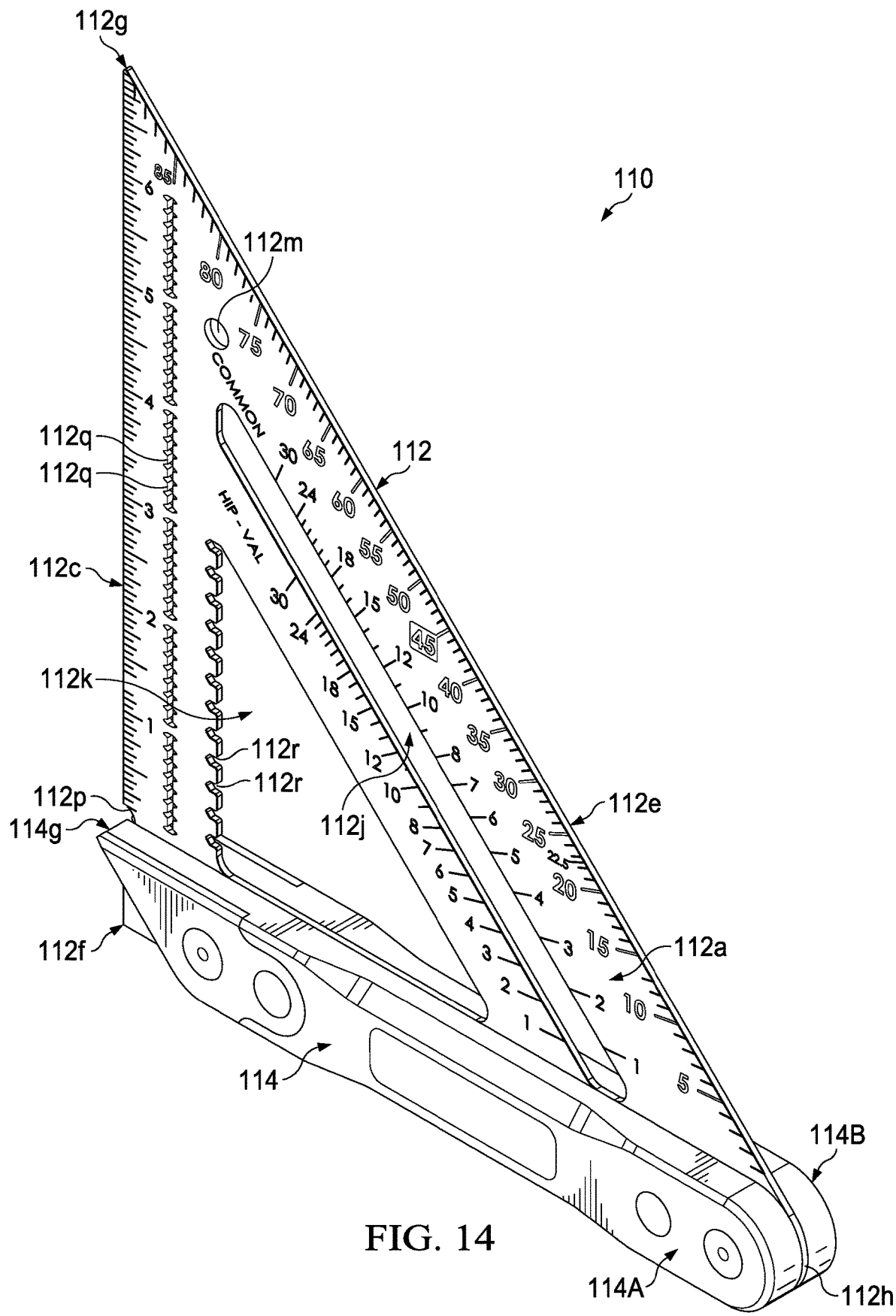
FIG. 14 is a top, front, right side perspective view of a second embodiment of a carpenter square in accordance with an aspect of the present disclosure.
Figure 15:
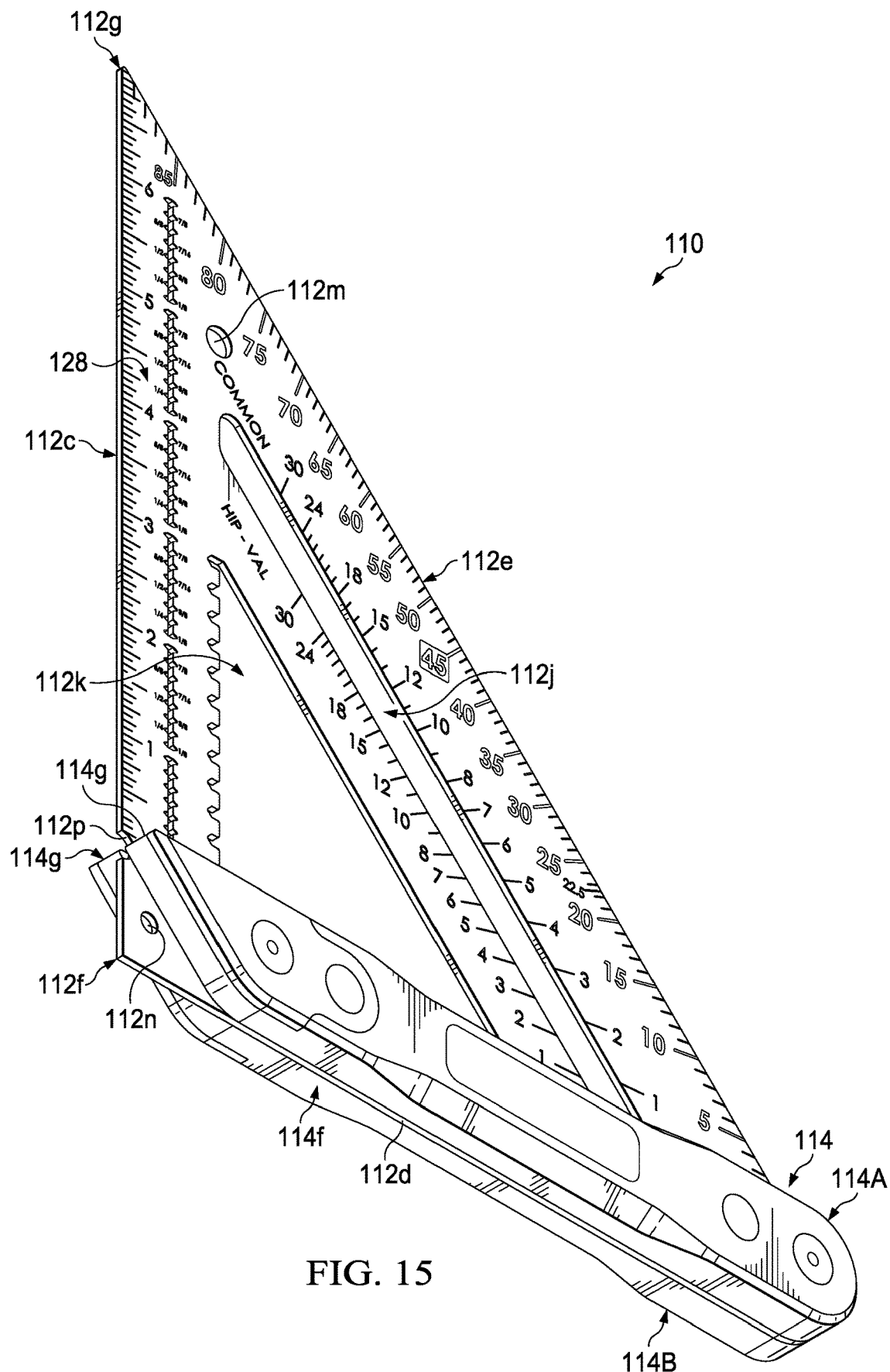
FIG. 15 is a bottom, front, left side perspective view of the carpenter square of FIG. 14.
Figure 16:
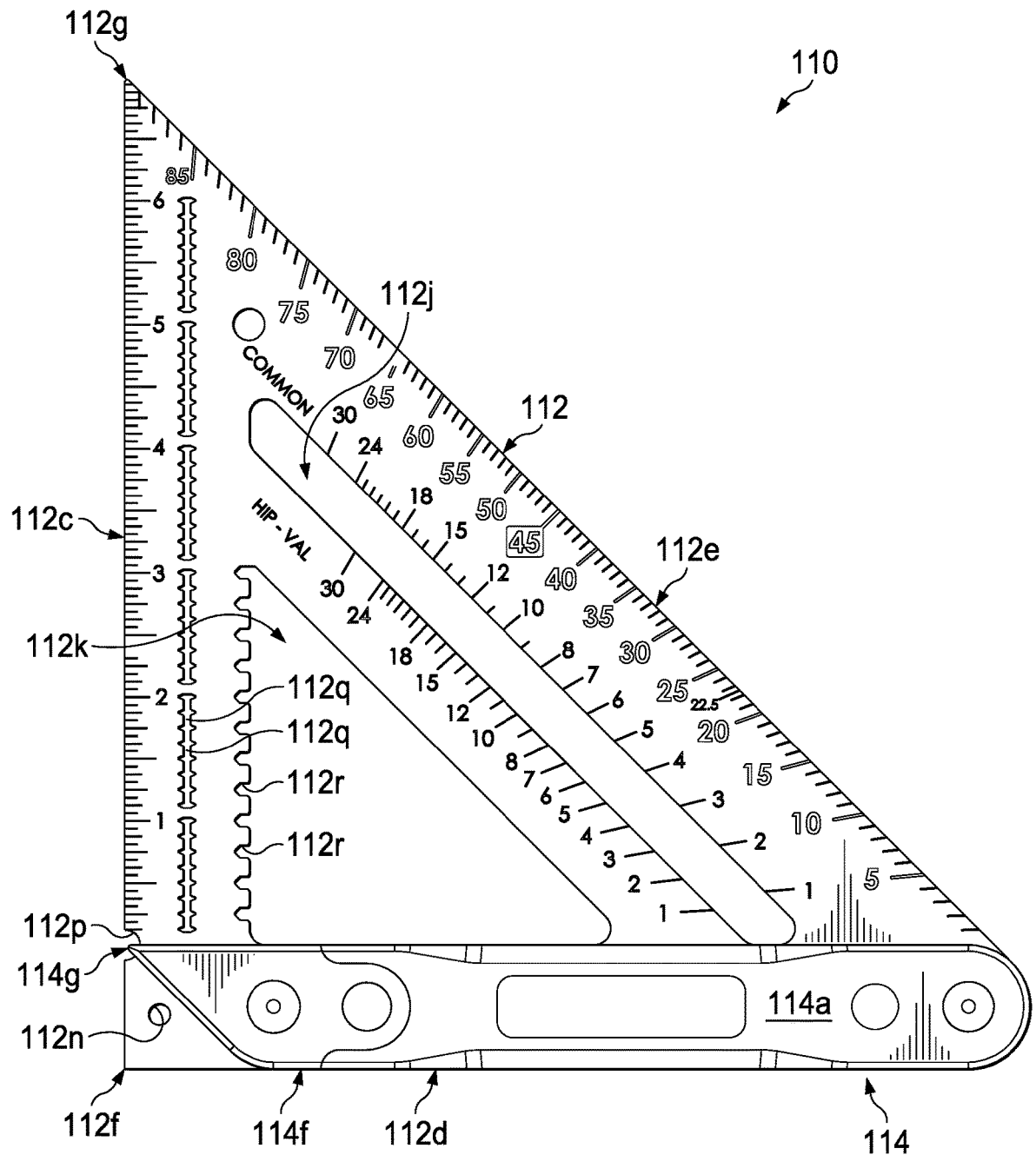
FIG. 16 is a front elevation view thereof.
Figure 17:
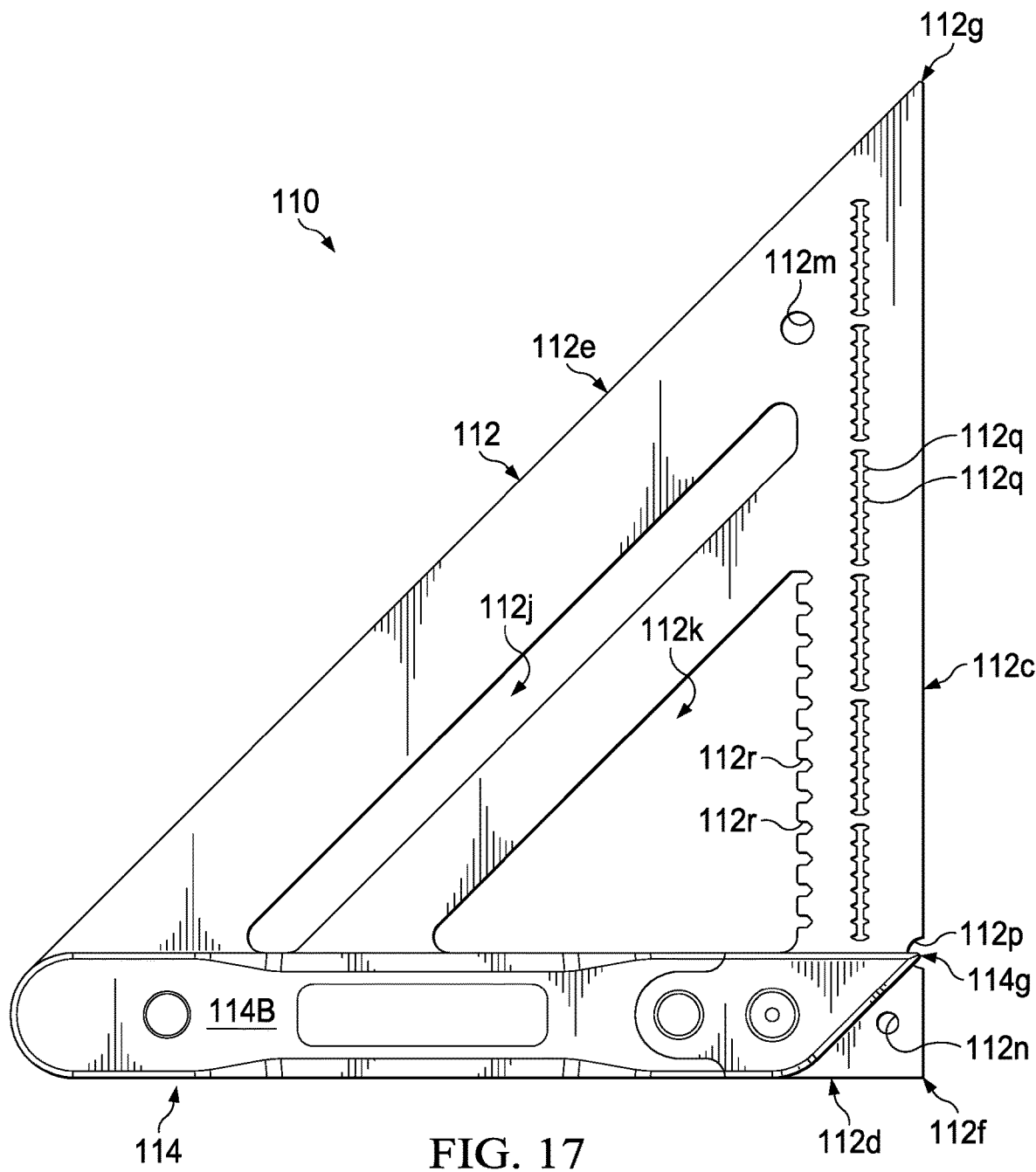
FIG. 17 is a rear elevation view thereof.

FIG. 13 shows yet another way of using carpenter square 10 in accordance with an aspect of the present disclosure. In this particular instance, the carpenter needs to transfer a measurement onto the surface "S" of the workpiece "W" at a location that is spaced a distance inwardly from the first side surface "W1". In this particular instance, the carpenter will rotate square 10 to place the blade 36 of square 10 in abutting contact with surface "S" and will place the second end 14f of base 14 in contact with first side surface "W1" of workpiece "W". The carpenter is then able to select one of the markings 30a and/or one of the indicia 30b of fifth scale 30 on blade 36 and make an appropriate line 350 on surface "S" with marking implement "M". As will be observed from FIG. 13, the marking 350 is able to be made a distance inwardly from the edge of the workpiece "W" where the first side wall "W1" intersects the surface "S". This is in contrast to the type of distance measurement that may be able to be made using the distance measurement scale 28 provided proximate first side edge 12c of plate 12.

Referring now to FIGS. 14 through 17, a second embodiment of a carpenter square in accordance with the present disclosure is illustrated, generally indicated at 110. Square 110 is substantially identical in structure and function as square 10 except for the differences which will be discussed hereafter. Carpenter square 110 comprises a plate 112 and a base 114 that are operatively engaged with one another. Plate 112 is substantially identical to plate 12 in that plate 112 is generally triangular in shape and includes a first surface 112*a*, a second surface 112*b* (FIG. 17), a first side edge 112*c*, a second side edge 112*d* (FIG. 15), and a hypotenuse 112*e*. Plate 112 also includes corners 112*f*, 112*g*, 112*h*, slot 112*j*, aperture 112*k*, holes 112*m*, 112*n* (FIG. 15), notch 112*p*, first scribing guides 112*q*, and 112*r*, which are all identical to the same components in plate 12.

Base 114 includes a first base section 114A and a second base section 114B. First base section 114A is identical in structure and function to first base section 14A. Second base section 114B is identical in structure and function to second base section 14B. In particular, each of the first base section 114A and second base section 114B define a corner 114*g* (at the intersection of a first end and first side of the base 114). Corner 114*g* extends outwardly beyond the pivot notch 112*p* defined in plate 112 and is useful for enabling pivoting of the square 110 relative to a surface of a workpiece as described earlier herein with reference to FIGS. 11A through 11C.

Plate 112 is substantially identical in structure and function to plate 12 and includes a first plate section 16A, a second plate section 16B, a third plate section 16C, and a fourth plate section 16D. Plate 112 is identical in all respects (structure and function) to plate 12 except that fourth plate section 16D is substantially equal in both height and length to base 114. In other words, the second side edge 112*d* of plate 112 is flush with a second end 114*f* (FIG. 15) of the base 114. The unnumbered second end of the base 114 is identical to the second end 14*f* of base 14. As a consequence, the blade 36 (FIG. 4) is effectively omitted from fourth plate section 116D and therefore fifth scale 30 is also omitted from square 110.

Square 110 is able to be used in an identical manner to square 10 to transfer measurements onto a workpiece except for the manner of use illustrated in FIG. 13. Because square 10 includes the blade 36, measurements are able to be transferred accurately to surface "S" from the fifth scale 30. Square 110, as indicated above, does not include a blade 36 and therefore also does not include fifth scale 30. Consequently, square 110 cannot be used to transfer distance measurements as accurately to surface "S" as can square 10. It is possible to transfer distance measurements to surface "S" using fourth scale 128 but this requires that second base section 114B be placed on the surface "S". The thickness of the second base section 114B resting on surface "S" causes plate 112 to not be able to lay flush against surface "S". Consequently, the accuracy of transferring measurements from fourth scale 128 of plate 110 to surface "S" is reduced relative to the manner in which the fifth scale 30 of blade 36 on square 10 is able to be used (FIG. 13).

All other features and functions of square 110 are identical to those of square 10 and therefore will not be discussed further herein.

A method of marking a measurement 50, 150, etc. on a workpiece "W" comprises providing a carpenter square 10 comprising a triangular plate 12 having a first side edge 12*c*, a second side edge 12*d* arranged at a right angle to the first side edge 12*c*, and a hypotenuse 12*e* located opposite the right angle (where the right angle is located at corner 12*f* of the plate 112. A base 14 engaged with the triangular plate 12 and has a first end 14*e* and a second end 14*f* opposed to the first end 14*e*. One or both of the first end 14*e* and the second end 14*f* is parallel to the second side edge 12*d* of the plate 12. A first region of the plate 12 (which includes regions 16A, 16B, and 16C) extends outwardly beyond the first end 14*e* of the base 14 in a first direction. A second region of the plate 12 which includes the region 36 (also identified as region 16D) extends outwardly beyond the second end 14*f* of the base 14 in a second direction which is opposite to the first direction. At least one first measurement scale is provided on the first region 16A, 16B, 16C of the plate 12. The at least one measurement scale includes both angular measurement scales 20 and 24, and distance measurement scale 28. A second measurement scale is provided on the second region 36, 16D of the plate 12. The second measurement scale is a distance measurement scale identified as 30. The method of using the carpenter square 10 includes arranging the plate 12 in a first orientation such as is illustrated in any of FIGS. 9 through 12, to measure one of a distance (FIG. 10 or 12 or simply by placing the square 10 on the surface "S" and selecting a distance marking 28*a* or 12*q*, 12*r* and drawing a line with the marking implement "M" along first side edge 12*c* or at right angles to first side edge 12*c* if one of the guides 12*q* or 12*r* is selected. The method using the carpenter square 10 in the first orientation can also include marking an angle measurement on the surface "S" by selecting any of the angle measurements 18*a*, and 24*a* provided on plate 10 using a marking implement "M".

Alternatively, carpenter square 10 may be rotated to bring the second region 36, 16D of the plate 10 into position to rest upon surface "S" as illustrated in FIG. 13 and then selecting one of the distance measurement markings 30*a* on the scale provided on the second region 36, 16D. Once the distance measurement 30*a* has been selected, the user may make a mark (such as mark 350) on the surface "S" with the marking implement "M".

The method of using the carpenter square with the plate 10 in the first orientation may include placing second surface 12*b* of the first region 16A, 16B, 16C of the plate 12 in abutting contact with a first workpiece surface "S", and placing the first end 14*e* of the base 14 adjacent a second workpiece surface "W1", wherein the second workpiece surface "W1" is at right angles to the first workpiece surface "S". Using the carpenter square 10 with the plate 12 in the second orientation may include placing second surface 12*b* of the second region 36, 16D of plate 12 in abutting contact with the first workpiece surface "S", and placing the second end 14*f* of the base 14 adjacent the second workpiece surface "W1".

Another exemplary method of marking a measurement on a workpiece "W" may include providing a carpenter square 10 including a plate 12 which is triangular in shape, wherein the plate 12 includes a first side edge 12*c* and a second side edge 12*d* arranged at a right angle to one another, and a hypotenuse 12*e* located opposite the right angle (where the right angle is at the intersection of the first side edge 12*c* and second side edge 12*d*). A base 14 is operatively engaged with plate 12 and is arranged generally parallel to the second side edge 12*d* of the plate 12. The base 14 has a first side 14*c* and a first end 14*e* that intersect at a corner 14*g*. The plate 12 defines a pivot notch 12*p* in the first side edge 12*c*; and the corner 14*g* of the base 14 extends over the pivot notch 12*p* when the base 14 is engaged with the plate 12. An angular measurement scale 18, 20, 24 is provided on the plate 12. The method includes placing the plate 12 onto a surface "S" of a workpiece "W"; placing the corner 14*g* of the base 14 in abutting contact with a first side wall "W1" of the workpiece "W", wherein the first side wall "W1" intersects the surface "S" of the workpiece along an edge "W3" (FIG. 13). The method includes pivoting the plate 12 about a pivot axis "X" (in the direction "B" or opposite to the direction "B"). The pivot axis "X" extends along the corner 14*g* of the base 14 and through the pivot notch 12*p* on the plate 12 (particularly through the center point "CP" of the pivot notch 12p). The plate is pivoted about pivot axis "X" to bring a selected measurement marking on the angular measurement scale 18, 20, 24 with the edge "W3" of the workpiece "W", and marking a line on the surface "S" of the workpiece "W" along the hypotenuse 12e of the plate 12. It should be understood that carpenter square 110 is able to be used to perform this same method in a substantially identical manner.

The carpenter is therefore able to mark a distance on surface "S" using either of the distance measurement scale 28 or distance measurement scale 30 simply by changing the orientation of carpenter square 10. The distance measurement scale 28 may be used to mark distances along an edge of workpiece "W" (where surface "S" and first side wall "W1" intersect, or along first side wall "W1", or along surface "S" using the square 10 in a first orientation. For example, orienting square 10 in a similar manner to the first orientation shown in FIG. 10, the distance measurement scale 28 could be used to mark a distance on the surface "S" by placing the tip of the marking implement "M" on the surface "S" adjacent an appropriate distance measurement marking 28a on distance measurement scale 28. Alternatively, arranging the square in the first orientation shown in FIG. 9, the carpenter may mark a distance on the side wall (unnumbered) of the workpiece "W" by placing the tip of the marking implement "M" on the side wall adjacent a selected distance measurement marking 28a on distance measurement scale.

If the carpenter wishes to mark a distance inwardly from the edge of the workpiece, in some instanced the thicker base 14 could lead to an incorrect distance measurement because placing the base 14 on the surface "S" of the workpiece "W" will cause the plate 12 to be arranged at a downwardly sloping angle relative to the surface "S". In these instances, the carpenter will rotate the square 10 into the second orientation, shown in FIG. 13. The carpenter is then able to measure distance along the distance measurement scale 30 and make an appropriate mark on the surface "S" using the marking implement "M".

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A carpenter square comprising:
   a plate which is triangular in shape, wherein the plate includes a first side edge and a second side edge arranged at a right angle to one another, and a hypotenuse located opposite the right angle; and a base operatively engaged with the plate and being arranged generally parallel to the second side edge of the plate;

wherein the base has a first side and a first end that intersect at a corner;

wherein the plate defines a pivot notch in the first side edge;

wherein the corner extends over the pivot notch when the base is engaged with the plate; and wherein the first side and the first end of the base are oriented at an angle of less than 90° to one another.

2. The carpenter square according to claim 1, wherein the first side and the first end of the base are oriented at an angle of about 45° to one another.

3. The carpenter square according to claim 1, wherein the pivot notch is semi-circular.

4. The carpenter square according to claim 3, wherein the semi-circular pivot notch has an imaginary center point, and wherein the corner of the base is aligned with the imaginary center point when the base is engaged with the plate.

5. The carpenter square according to claim 3, wherein the base has a second end opposed to the first end, wherein one or both of the first end and the second end are parallel to the second side edge of the plate, and wherein a first region of the plate extends outwardly beyond the first end of the base in a first direction, and a second region of the plate extends outwardly beyond the second end of the base in a second direction.

6. The carpenter square according to claim 5, further comprising:

a first measurement scale provided on the first region of the plate; and a second measurement scale provided on the second region of the plate.

7. The carpenter square according to claim 6, wherein the first measurement scale is one of an angular measurement scale and a distance measurement scale.

8. The carpenter square according to claim 6, wherein the second measurement scale is a distance measurement scale.

9. The carpenter square according to claim 5, wherein the second region is about ½ inch in height measured from the second end of the base to the second side edge of the plate.

10. The carpenter square according to claim 5, wherein the first region and the second region of the plate are arranged in a same plane.

11. The carpenter square according to claim 1, wherein a region of the base including the corner is reinforced.

12. The carpenter square according to claim 1, further comprising a first surface and a second surface provided on the plate, wherein the second surface is opposed to the first surface; wherein the first surface and the second surface extend between the first side edge, the second side edge, and the hypotenuse; and wherein the plate is of a thickness measured between the first surface and the second surface, and the thickness is about 1/16 inch.

13. The carpenter square according to claim 1, wherein the base has a second end opposed to the first end, wherein one or both of the first end and the second end are parallel to the second side edge of the plate, and wherein the second side edge of the plate is substantially flush with the second end of the base.

14. A carpenter square comprising:

a plate which is triangular in shape, wherein the plate includes a first side edge and a second side edge arranged at a right angle to one another, and a hypotenuse located opposite the right angle; and a base operatively engaged with plate;

wherein the base has a first side, a first end, and a second end opposed to the first end, wherein the first side and the first end intersect at a corner and are oriented at an angle of less than 90° to one another;

wherein one or both of the first end and the second end is parallel to the second side edge of the plate; and wherein a first region of the plate extends outwardly beyond the first end of the base in a first direction, and a second region of the plate extends outwardly beyond the second end of the base in a second direction.

15. The carpenter square according to claim 14, further comprising:

a first measurement scale provided on the first region of the plate; and a second measurement scale provided on the second region of the plate.

16. The carpenter square according to claim 15, wherein the first measurement scale is one of an angular measurement scale and a distance measurement scale.

17. The carpenter square according to claim 15, wherein the second measurement scale is a distance measurement scale.

18. A method of marking a measurement on a workpiece comprising:

providing a carpenter square comprising a plate which is triangular and has a first side edge, a second side edge arranged at a right angle to the first side edge, and a hypotenuse located opposite the right angle; and a base engaged with the triangular plate, wherein the base has a first side, a first end, and a second end opposed to the first end, wherein the first side and the first end intersect at a corner and are oriented at an angle of less than 90° to one another; wherein one or both of the first end and the second end is parallel to the second side edge of the plate; and wherein a first region of the plate extends outwardly beyond the first end of the base in a first direction, and a second region of the plate extends outwardly beyond the second end of the base in a second direction;

providing a first measurement scale on the first region of the plate;

providing a second measurement scale on the second region of the plate;

using the carpenter square with the plate in a first orientation to measure one of a distance and an angle with the first measurement scale;

using the carpenter square with the plate in a second orientation to measure a distance with the second measurement scale.

19. The method according to claim 18, wherein using the carpenter square with the plate in the first orientation includes placing a surface of the first region of the plate in abutting contact with a first workpiece surface, and placing the first end of the base adjacent a second workpiece surface, where the second workpiece surface is at right angles to the first workpiece surface.

20. The method according to claim 19, wherein using the carpenter square with the plate in the second orientation includes placing a surface of the second region of the plate in abutting contact with the first workpiece surface, and placing the second end of the base adjacent the second workpiece surface.

21. The method according to claim 18, further comprising:

defining a pivot notch in the first side edge of the plate;
extending the corner of the base over the pivot notch;
placing the base's corner on a side wall of a workpiece; and
pivoting the plate about a pivot axis extending along the base's corner.

\* \* \* \* \*